(12) United States Patent
Xiao et al.

(10) Patent No.: US 11,864,571 B2
(45) Date of Patent: Jan. 9, 2024

(54) LUCUMA NERVOSA ESSENCE AND LUCUMA NERVOSA AROMA ENHANCER, PREPARATION METHOD AND APPLICATIONS THEREOF

(71) Applicant: SHANGHAI INSTITUTE OF TECHNOLOGY, Shanghai (CN)

(72) Inventors: Zuobing Xiao, Shanghai (CN); Jiancai Zhu, Shanghai (CN); Yunwei Niu, Shanghai (CN)

(73) Assignee: SHANGHAI INSTITUTE OF TECHNOLOGY, Shanghai (CN)

( * ) Notice: Subject to any disclaimer, the term of this patent is extended or adjusted under 35 U.S.C. 154(b) by 383 days.

(21) Appl. No.: 17/270,064

(22) PCT Filed: Apr. 23, 2020

(86) PCT No.: PCT/CN2020/086401
§ 371 (c)(1),
(2) Date: Feb. 22, 2021

(87) PCT Pub. No.: WO2021/022834
PCT Pub. Date: Feb. 11, 2021

(65) Prior Publication Data
US 2021/0315243 A1    Oct. 14, 2021

(30) Foreign Application Priority Data
Feb. 28, 2020   (CN) .......................... 202010129611.1

(51) Int. Cl.
*A23L 27/12* (2016.01)
*A23L 27/00* (2016.01)
*A23L 27/10* (2016.01)

(52) U.S. Cl.
CPC .............. *A23L 27/12* (2016.08); *A23L 27/11* (2016.08); *A23L 27/115* (2016.08); *A23L 27/88* (2016.08)

(58) Field of Classification Search
CPC .......... A23L 27/12; A23L 27/88; A23L 27/11; A23L 27/115
USPC ................... 426/534, 535, 650, 615
See application file for complete search history.

(56) References Cited

FOREIGN PATENT DOCUMENTS

| CN | 102164509 A | 8/2011 |
| CN | 110393290 A | 11/2019 |
| EP | 1417896 A1 | 5/2004 |
| JP | 2006265118 A | 10/2006 |

OTHER PUBLICATIONS

PubChem [Internet]. Bethesda (MD): National Library of Medicine (US), National Center for Biotechnology Information; 2004-. PubChem Compound Summary for CID 13346428, 3,7-Dimethyl-6-octenyl 3,7-dimethyl-6-octenoate; [cited May 5, 2023]. Available from: https://pubchem.ncbi.nlm.nih.gov/compound/3_7-Dimethyl-6-octeny.*

PubChem [Internet]. Bethesda (MD): National Library of Medicine (US), National Center for Biotechnology Information; 2004-. PubChem Compound Summary for CID 85520, 3-(Methylthio)propyl butyrate; [cited May 5, 2023]. Available from: https://pubchem.ncbi.nlm.nih.gov/compound/3-_Methylthio_propyl-butyrate.*

Ji'nan Research Institute for Light Industry, "Methyl Citronellate", Handbook of Synthetic Fragrance Materials, Sep. 30, 1985, 583-584.

Heli Ji, "Butanoic Acid 3-(Methylthio) Propyl Ester", China Food Additives and Ingredients Manual, Jun. 30, 2016, 912-913.

* cited by examiner

*Primary Examiner* — Leslie A Wong
(74) *Attorney, Agent, or Firm* — Bayramoglu Law Offices LLC

(57) ABSTRACT

A *Lucuma nervosa* essence, a *Lucuma nervosa* aroma enhancer, a preparation method and applications thereof are disclosed. The *Lucuma nervosa* aroma enhancer includes methyl 3,7-dimethyl-6-octenoate and/or 3-(methylthio)propyl butyrate. A mass percentage of the *Lucuma nervosa* aroma enhancer in a *Lucuma nervosa* essence is 0.08%-1.1%, the *Lucuma nervosa* essence includes a substrate and the *Lucuma nervosa* aroma enhancer. The preparation method of the *Lucuma nervosa* essence includes mixing the components of the *Lucuma nervosa* essence. The *Lucuma nervosa* essence can be applied in preparing a food and/or a flavoring with a *Lucuma nervosa* flavor. When the *Lucuma nervosa* aroma enhancer provided by the present invention is used in combination with a *Lucuma nervosa* extract, or mixed with a composition in conjunction with other essence raw materials, the prepared *Lucuma nervosa* essence has full fruity aroma and strong sulfide aroma, thus effectively improving the aroma and taste of final products.

16 Claims, 12 Drawing Sheets

LUCUMA NERVOSA ESSENCE AND LUCUMA NERVOSA AROMA ENHANCER, PREPARATION METHOD AND APPLICATIONS THEREOF

This application is the national phase entry of International Application No. PCT/CN2020/086401, filed on Apr. 23, 2020, which is based upon and claims priority to Chinese Patent Application No. 202010129611.1, filed on Feb. 28, 2020, the entire contents of which are incorporated herein by reference.

TECHNICAL FIELD

The present invention relates to the field of food flavor chemistry, and more particularly, to a *Lucuma nervosa* essence, a *Lucuma nervosa* aroma enhancer, a preparation method and applications thereof.

BACKGROUND

*Lucuma nervosa* A.DC. is an important tropical fruit with high nutritional value. The flesh contains numerous starch, sugars, fats, carbohydrates and proteins, as well as multiple vitamins and abundant minerals. In addition, the unique sulfide aroma of *Lucuma nervosa* is highly preferred by consumers, and is widely used in drinks, foods or flavorings with a tropical fruit flavor.

At present, there are reports that aroma substances are extracted directly from *Lucuma nervosa* as essences, but the flavor of *Lucuma nervosa* is easily lost during the process of preparing *Lucuma nervosa* essences, which affects the aroma and taste of final products.

When using the aroma simulation and compounding technology to prepare a *Lucuma nervosa* essence, there are some problems such as poor natural lifelike sense and aromatics that are not optimal. The main reason is the deficiency of gas chromatography-mass spectrometry (GC-MS) and other analytical techniques, which leads to the fact that the key trace components existing in *Lucuma nervosa* cannot be detected, or the substances with similar structures are difficult to separate. These trace components, although present in low amounts, tend to contribute significantly to the overall aroma of *Lucuma nervosa*. In addition, various aromatic components may be identified by the instrument, but not all of these components meet Flavor and Extract Manufacturers Association (FEMA) standards, national standards or achieve commercial production.

The above-mentioned problems collectively result in unsatisfactory natural lifelike sense and less than optimal degree of the aroma of the *Lucuma nervosa*. Therefore, it is an urgent technical problem to be solved in this field to prepare a *Lucuma nervosa* essence with an authentic, harmonious and stable aroma.

SUMMARY

The technical problem to be solved by the present invention is to overcome the following deficiencies in the prior art. The method of directly extracting and preparing a natural *Lucuma nervosa* essence from *Lucuma nervosa* will destroy the flavor of *Lucuma nervosa* and affect the aroma and taste of final products. When using the aroma simulation and compounding technology to prepare the *Lucuma nervosa* essence, the key trace components existing in *Lucuma nervosa* cannot be detected due to the deficiency of gas chromatography-mass spectrometry (GC-MS) and other analytical techniques, and not all of the detected components meet FEMA and national standards. In view of the above deficiencies, the present invention provides a *Lucuma nervosa* essence, a *Lucuma nervosa* aroma enhancer, and a preparation method and applications thereof. When the *Lucuma nervosa* aroma enhancer provided by the present invention is used in combination with a *Lucuma nervosa* extract, or mixed with a composition in conjunction with other essence raw materials, the prepared *Lucuma nervosa* essence has full fruity aroma and strong sulfide aroma, thus effectively improving the aroma and taste of the final products. The prepared *Lucuma nervosa* essence has authentic, harmonious and stable aroma, and is suitable for industrial production.

The present invention adopts the following technical solution to solve the above technical problems.

The present invention provides a *Lucuma nervosa* aroma enhancer, including methyl 3,7-dimethyl-6-octenoate and/or 3-(methylthio)propyl butyrate.

In the present invention, a mass percentage of the *Lucuma nervosa* aroma enhancer in a *Lucuma nervosa* essence is 0.08%-1.1%, preferably 0.1%-1%, and more preferably 0.25%-0.9%, for example, 0.4%, 0.5%, 0.6%, 0.75% or 0.8%.

The *Lucuma nervosa* essence includes a substrate and the *Lucuma nervosa* aroma enhancer, in which the substrate includes a *Lucuma nervosa* extract and/or a *Lucuma nervosa* aroma composition.

When the substrate is the *Lucuma nervosa* aroma composition, and the *Lucuma nervosa* aroma enhancer is the methyl 3,7-dimethyl-6-octenoate, the mass percentage of the *Lucuma nervosa* aroma enhancer in the *Lucuma nervosa* essence is 0.1%-1%, and preferably 0.3%-0.7%, for example, 0.5%.

When the substrate is the *Lucuma nervosa* aroma composition, and the *Lucuma nervosa* aroma enhancer is the 3-(methylthio)propyl butyrate, the mass percentage of the *Lucuma nervosa* aroma enhancer in the *Lucuma nervosa* essence is 0.1%-1%, and preferably 0.3%-0.75%, for example, 0.5%.

When the substrate is the *Lucuma nervosa* aroma composition, and the *Lucuma nervosa* aroma enhancer is the methyl 3,7-dimethyl-6-octenoate and the 3-(methylthio)propyl butyrate, the mass percentage of the *Lucuma nervosa* aroma enhancer in the *Lucuma nervosa* essence is 0.1%-1%, preferably 0.2%-0.8%, and more preferably 0.25%-0.75%, for example, 0.5% or 0.6%.

A mass ratio of the methyl 3,7-dimethyl-6-octenoate to the 3-(methylthio)propyl butyrate is 1:(5-0.2), preferably 1:(4-0.25), and more preferably 1:(1.5-0.66), for example, 1:1 or 1.5:1.

In a preferred embodiment, when the substrate is the *Lucuma nervosa* aroma composition, and the *Lucuma nervosa* aroma enhancer is the methyl 3,7-dimethyl-6-octenoate and the 3-(methylthio)propyl butyrate, an amount of the *Lucuma nervosa* aroma enhancer and the mass ratio of the methyl 3,7-dimethyl-6-octenoate to the 3-(methylthio)propyl butyrate may be shown as the following numbers 1-10.

TABLE 1

| Number | Mass ratio of the methyl 3,7-dimethyl-6-octenoate to the 3-(methylthio)propyl butyrate | Mass percentage of the *Lucuma nervosa* aroma enhancer in the *Lucuma nervosa* essence |
| --- | --- | --- |
| 1 | 1:4 | 0.5% |
| 2 | 1:1.5 | 0.5% |
| 3 | 1:1.5 | 0.1% |
| 4 | 1:1.5 | 0.25% |
| 5 | 1:1.5 | 0.6% |
| 6 | 1:1.5 | 0.75% |
| 7 | 1:1.5 | 1% |
| 8 | 1:1 | 0.5% |
| 9 | 1.5:1 | 0.5% |
| 10 | 1:0.25 | 0.5% |

In a preferred embodiment, when the substrate is the *Lucuma nervosa* aroma composition, and a ratio of parts by weight of the methyl 3,7-dimethyl-6-octenoate to the 3-(methylthio)propyl butyrate is 1:1.5, the mass percentage of the *Lucuma nervosa* aroma enhancer in the *Lucuma nervosa* essence is 0.1%-1%, preferably 0.2%-0.8%, and more preferably 0.25%-0.75%, for example, 0.5% or 0.6%.

When the substrate is the *Lucuma nervosa* extract, and the *Lucuma nervosa* aroma enhancer is the methyl 3,7-dimethyl-6-octenoate, the mass percentage of the *Lucuma nervosa* aroma enhancer in the *Lucuma nervosa* essence is 0.1%-1%, and preferably 0.2%-0.8%, for example, 0.4%.

When the substrate is the *Lucuma nervosa* extract, and the *Lucuma nervosa* aroma enhancer is the 3-(methylthio)propyl butyrate, the mass percentage of the *Lucuma nervosa* aroma enhancer in the *Lucuma nervosa* essence is 0.1%-1%, and preferably 0.5%-0.8%.

When the substrate is the *Lucuma nervosa* extract, and the *Lucuma nervosa* aroma enhancer is the methyl 3,7-dimethyl-6-octenoate and the 3-(methylthio)propyl butyrate, the mass percentage of the *Lucuma nervosa* aroma enhancer in the *Lucuma nervosa* essence is 0.1%-1%, and preferably 0.5%-0.9%, for example, 0.6%.

The mass ratio of the methyl 3,7-dimethyl-6-octenoate to the 3-(methylthio)propyl butyrate is 1:(5.5-0.15), preferably 1:(5-0.2), and more preferably 1:1.25.

In a preferred embodiment, when the substrate is the *Lucuma nervosa* extract, and the mass ratio of the methyl 3,7-dimethyl-6-octenoate to the 3-(methylthio)propyl butyrate is 1:5, the mass percentage of the *Lucuma nervosa* aroma enhancer in the *Lucuma nervosa* essence is 0.6%.

In a preferred embodiment, when the substrate is the *Lucuma nervosa* extract, and the ratio of parts by weight of the methyl 3,7-dimethyl-6-octenoate to the 3-(methylthio)propyl butyrate is 1:1.25, the mass percentage of the *Lucuma nervosa* aroma enhancer in the *Lucuma nervosa* essence is 0.9%.

In a preferred embodiment, when the substrate is the *Lucuma nervosa* extract, and the ratio of parts by weight of the methyl 3,7-dimethyl-6-octenoate to the 3-(methylthio)propyl butyrate is 1:0.2, the mass percentage of the *Lucuma nervosa* aroma enhancer in the *Lucuma nervosa* essence is 0.6%.

The present invention further provides a *Lucuma nervosa* essence, including the substrate and the *Lucuma nervosa* aroma enhancer described above.

In the present invention, when the substrate is the *Lucuma nervosa* extract, the *Lucuma nervosa* essence includes the following components in parts by weight: 99-99.9 parts of the *Lucuma nervosa* extract and 0.1-1 parts of the *Lucuma nervosa* aroma enhancer, in which a total amount of the *Lucuma nervosa* extract and the *Lucuma nervosa* aroma enhancer is 100 parts by weight.

In the present invention, a preparation method of the *Lucuma nervosa* extract can be a conventional preparation method in the art, preferably a supercritical carbon dioxide ($CO_2$) extraction method, a steam distillation method or a solvent extraction method, and more preferably the supercritical $CO_2$ extraction method.

When the supercritical $CO_2$ extraction method is adopted, the preparation method of the *Lucuma nervosa* extract preferably includes the following steps: under a gas environment of supercritical $CO_2$, performing an extraction on fruit paste of the *Lucuma nervosa* and drying.

The extraction is generally performed in a supercritical extraction device. A temperature of the extraction is 30-50° C., for example, 40° C. A time of the extraction is 2-3 h, for example, 2.5 h. A pressure in the supercritical extraction device is 5-7 Mpa, for example, 6 Mpa. A solvent used in the extraction is carbon dioxide.

The drying can be conducted under conventional operation conditions and by conventional methods in the art, preferably using anhydrous sodium sulfate for the drying.

In the present invention, when the substrate is the *Lucuma nervosa* aroma composition, the *Lucuma nervosa* essence includes the following components in parts by weight: 1-10 parts of 2-methylpropanol, 0.1-1 part of 3-methylbutyraldehyde, 0.1-1 part of valeraldehyde, 1-6 parts of 2-methyl-1-butanol, 0.1-2 parts of hexaldehyde, 0.2-1 part of 3-mercapto-3-methyl-1-butanol, 0.02-0.5 parts of 2-methylthio ethanol, 0.05-1 part of hexanol, 0.05-1 part of trans-2-octenal, 0.05-1 part of dimethyl trisulfide, 0.1-2 parts of octylaldehyde, 0.05-1 part of 2-ethylhexanol, 0.05-1 part of cis-4-decenal, 0.05-1 part of nonanal, 0.02-1 part of (E,Z)-2,6-nonadienal, 0.01-0.3 parts of (Z,Z)-3,6-nonadienol, 0.01-1 part of decanal, 0.01-0.5 parts of trans-2-decenal, 0.05-1 part of ethyl decanoate and 0.1-1 part of the *Lucuma nervosa* aroma enhancer.

An amount of the 2-methylpropanol is preferably 2.5 parts by weight.

An amount of the 3-methylbutyraldehyde is preferably 0.25 parts by weight.

An amount of the valeraldehyde is preferably 0.2 parts by weight.

An amount of the 2-methyl-1-butanol is preferably 3 parts by weight.

An amount of the hexaldehyde is preferably 0.5 parts by weight.

An amount of the 3-mercapto-3-methyl-1-butanol is preferably 0.5 parts by weight.

An amount of the 2-methylthio ethanol is preferably 0.1 parts by weight.

An amount of the hexanol is preferably 0.15 parts by weight.

An amount of the trans-2-octenal is preferably 0.3 parts by weight.

An amount of the dimethyl trisulfide is preferably 0.25 parts by weight.

An amount of the octylaldehyde is preferably 0.5 parts by weight.

An amount of the 2-ethylhexanol is preferably 0.1 parts by weight.

An amount of the cis-4-decenal is preferably 0.15 parts by weight.

An amount of the nonanal is preferably 0.25 parts by weight.

An amount of the (E,Z)-2,6-nonadienal is preferably 0.1 parts by weight.

An amount of the (Z,Z)-3,6-nonadienol is preferably 0.05 parts by weight.

An amount of the decanal is preferably 0.25 parts by weight.

An amount of the trans-2-decenal is preferably 0.1 parts by weight.

An amount of the ethyl decanoate is preferably 0.15 parts by weight.

In the present invention, when the substrate is the *Lucuma nervosa* aroma composition, the *Lucuma nervosa* essence further includes at least one selected from the group consisting of butyraldehyde, trans-2-pentenal, benzaldehyde and limonene.

An amount of the butyraldehyde can be a conventional amount in parts by weight in the art, preferably 0.01-0.5 parts by weight, and more preferably 0.05 parts by weight.

An amount of the trans-2-pentenal can be a conventional amount in parts by weight in the art, preferably 0.05-0.5 parts by weight, and more preferably 0.15 parts by weight.

An amount of the benzaldehyde can be a conventional amount in parts by weight in the art, preferably 0.1-1 part by weight, and more preferably 0.4 parts by weight.

An amount of the limonene can be a conventional amount in parts by weight in the art, preferably 0.05-0.5 parts by weight, and more preferably 0.15 parts by weight.

In the present invention, when the substrate is the *Lucuma nervosa* aroma composition, the *Lucuma nervosa* essence further includes a solvent, and the solvent includes at least one selected from the group consisting of water, an alcohol solvent, an ester solvent and edible oil.

The alcohol solvent is preferably at least one selected from the group consisting of ethanol, propylene glycol and glycerol.

The ester solvent is preferably glyceryl triacetate.

The edible oil is preferably salad oil.

An amount of the solvent is 80-93 parts by weight, and preferably 86.6-92.6 parts by weight. The amount of the solvent is configured to complement the *Lucuma nervosa* essence to be a total amount of 100 parts by weight.

In a preferred embodiment of the present invention, the *Lucuma nervosa* essence includes the following components: the 2-methylpropanol, the 3-methylbutyraldehyde, the valeraldehyde, the 2-methyl-1-butanol, the hexaldehyde, the 3-mercapto-3-methyl-1-butanol, the 2-methylthio ethanol, the hexanol, the trans-2-octenal, the dimethyl trisulfide, the octylaldehyde, the 2-ethylhexanol, the cis-4-decenal, the nonanal, the (E,Z)-2,6-nonadienal, the (Z,Z)-3,6-nonadienol, the decanal, the trans-2-decenal, the ethyl decanoate, the salad oil and the methyl 3,7-dimethyl-6-octenoate.

In a preferred embodiment of the present invention, the *Lucuma nervosa* essence includes the following components: the 2-methylpropanol, the 3-methylbutyraldehyde, the valeraldehyde, the 2-methyl-1-butanol, the hexaldehyde, the 3-mercapto-3-methyl-1-butanol, the 2-methylthio ethanol, the hexanol, the trans-2-octenal, the dimethyl trisulfide, the octylaldehyde, the 2-ethylhexanol, the cis-4-decenal, the nonanal, the (E,Z)-2,6-nonadienal, the (Z,Z)-3,6-nonadienol, the decanal, the trans-2-decenal, the ethyl decanoate, the salad oil and the 3-(methylthio)propyl butyrate.

In a preferred embodiment of the present invention, the *Lucuma nervosa* essence includes the following components: the 2-methylpropanol, the 3-methylbutyraldehyde, the valeraldehyde, the 2-methyl-1-butanol, the hexaldehyde, the 3-mercapto-3-methyl-1-butanol, the 2-methylthio ethanol, the hexanol, the trans-2-octenal, the dimethyl trisulfide, the octylaldehyde, the 2-ethylhexanol, the cis-4-decenal, the nonanal, the (E,Z)-2,6-nonadienal, the (Z,Z)-3,6-nonadienol, the decanal, the trans-2-decenal, the ethyl decanoate, the salad oil, the methyl 3,7-dimethyl-6-octenoate and the 3-(methylthio)propyl butyrate. A total content and a ratio of parts by weight of the methyl 3,7-dimethyl-6-octenoate and the 3-(methylthio)propyl butyrate are the same as those in the *Lucuma nervosa* essence prepared by the *Lucuma nervosa* aroma composition.

In a preferred embodiment of the present invention, the *Lucuma nervosa* essence includes the following components: the *Lucuma nervosa* extract and the methyl 3,7-dimethyl-6-octenoate.

In a preferred embodiment of the present invention, the *Lucuma nervosa* essence includes the following components: the *Lucuma nervosa* extract and the 3-(methylthio)propyl butyrate.

In a preferred embodiment of the present invention, the *Lucuma nervosa* essence includes the following components: the *Lucuma nervosa* extract, the methyl 3,7-dimethyl-6-octenoate and the 3-(methylthio)propyl butyrate.

The present invention further provides a preparation method of the *Lucuma nervosa* essence, including the following step: mixing the components of the *Lucuma nervosa* essence.

The present invention further provides an application of the *Lucuma nervosa* aroma enhancer as an aroma enhancer in preparing the *Lucuma nervosa* essence.

The present invention further provides an application of the *Lucuma nervosa* essence in preparing a food and/or a flavoring with a *Lucuma nervosa* flavor.

An amount of the *Lucuma nervosa* essence in the food or flavoring can be a conventional amount used in the art.

The food can be a conventional food in the art, such as biscuit, beverage or bread.

On the basis of conforming to the common sense in the art, the above preferred conditions can be arbitrarily combined to obtain the preferred embodiments of the present invention.

The raw materials used in the present invention are commercially available.

The advantages of the present invention are that when the *Lucuma nervosa* aroma enhancer provided by the present invention is used in combination with the *Lucuma nervosa* extract, or mixed with the composition in conjunction with other essence raw materials, the prepared *Lucuma nervosa* essence has full fruity aroma and strong sulfide aroma, thus effectively improving the aroma and taste of final products. The prepared *Lucuma nervosa* essence has authentic, harmonious and stable aroma, and is suitable for industrial production.

DETAILED DESCRIPTION OF THE EMBODIMENTS

Figure 1:
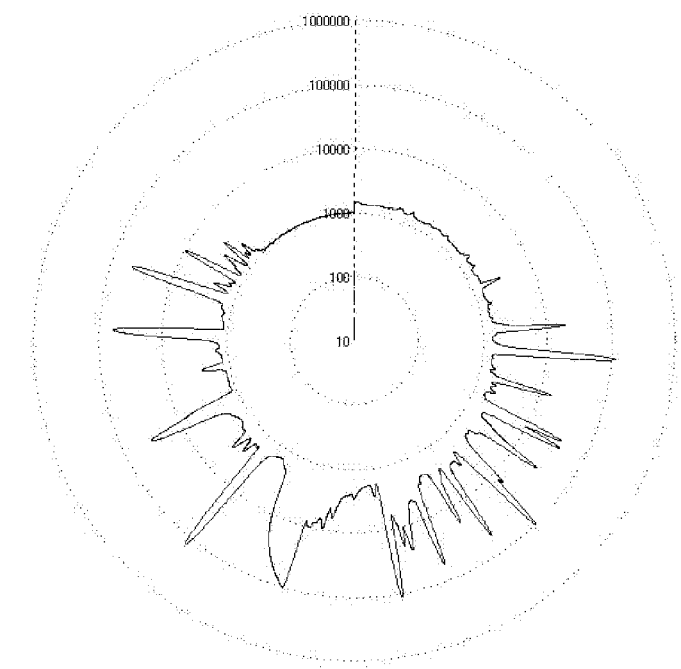
FIG. 1 is a diagram showing radar of sensory of the *Lucuma nervosa* essence prepared by embodiment 4 of the present invention detected by an electronic nose (e-nose) system.

The present invention is further described by means of embodiments, but is not limited to the scope of the embodiments. In the following embodiments, the experimental methods without specific conditions are selected according to the conventional methods and conditions, or according to the commercial specifications.

The following sensory evaluation method is used for sensory tests in the following effect examples.

The sensory evaluation method is used for screening testing according to ISO8586-2012 standard. The sensory group consists of 50 members (28 male members and 22 female members, aged 20-34 years). 30 of them come from the sensory evaluation laboratory of School of Perfume and Aroma Technology of Shanghai Institute of Technology, regularly participate in aroma evaluation work, and have rich experience in sensory testing. The other 20 are volunteers who have no experience in sensory evaluation. The sensory scoring standard is "0-10", in which "0" represents the minimum satisfaction, and "10" represents the maximum satisfaction. The aroma of *Lucuma nervosa* itself is rated as 10 points for evaluation. Each sample is repeated three times to take the average value.

The source, mass fraction and purity of each component in *Lucuma nervosa* essences of the following embodiments and comparative examples are shown in Table 2.

TABLE 2

| Component | Supplier | Mass fraction | Purity |
|---|---|---|---|
| Butyraldehyde | Sigma-Aldrich | >=98% | Food grade |
| 2-methylpropanol | Sigma-Aldrich | >=98% | Food grade |
| 3-methylbutyraldehyde | Sigma-Aldrich | >=98% | Food grade |
| Trans-2-pentenal | Sigma-Aldrich | >=98% | Food grade |
| Valeraldehyde | Sigma-Aldrich | >=98% | Food grade |
| 2-methyl-1-butanol | Sigma-Aldrich | >98% | Food grade |
| Hexaldehyde | Sigma-Aldrich | >98% | Food grade |
| 3-mercapto-3-methyl-1-butanol | Sigma-Aldrich | 98% | Food grade |
| 2-methylthio ethanol | Sigma-Aldrich | 99% | Food grade |
| Hexanol | Sigma-Aldrich | >=98% | Food grade |
| Trans-2-octenal | Advanced Biotech | >=98% | Food grade |
| Benzaldehyde | Advanced Biotech | >=98% | Food grade |
| Dimethyl trisulfide | Advanced Biotech | >=98% | Food grade |
| Octylaldehyde | Advanced Biotech | >=98% | Food grade |
| 2-ethylhexanol | Advanced Biotech | >=98% | Food grade |
| Limonene | Advanced Biotech | >=98% | Food grade |
| Cis-4-decenal | Advanced Biotech | >=97% | Food grade |
| Nonanal | A.C.S. International | 99% | Food grade |
| (E,Z)-2,6-nonadienal | Advanced Biotech | >=98% | Food grade |
| (Z,Z)-3,6-nonadienol | A.C.S. International | 99% | Food grade |
| Decanal | Bedoukian Research | >98% | Food grade |
| Trans-2-decenal | Bedoukian Research | >=98% | Food grade |
| Ethyl decanoate | Bedoukian Research | >=98% | Food grade |
| Methyl 3,7-dimethyl-6-octenoate | Jiangyin Healthway | 98% | Food grade |
| 3-(methylthio)propyl butyrate | Advanced Biotech | >=98% | Food grade |
| Salad oil | Advanced Biotech | 98% | Food grade |
| Isovaleraldehyde | ANPEL Laboratory Technologies (Shanghai) Inc. | 99% | Food grade |
| 2-methylheptanal | ANPEL Laboratory Technologies (Shanghai) Inc. | 98% | Food grade |
| 2-methyloctanal | ANPEL Laboratory Technologies (Shanghai) Inc. | 98% | Food grade |
| 2-methylnonanal | ANPEL Laboratory Technologies (Shanghai) Inc. | 98% | Food grade |
| Methyl 3-nonenoate | ANPEL Laboratory Technologies (Shanghai) Inc. | 98% | Food grade |
| 3-(methylthio)propyl acetate | ANPEL Laboratory Technologies (Shanghai) Inc. | 98% | Food grade |

The preparation method of the *Lucuma nervosa* essences in both embodiments 1-33 and comparative examples 1-22 is as follows: the substrate and the *Lucuma nervosa* aroma enhancer are mixed to obtain the *Lucuma nervosa* essence.

The preparation method of the *Lucuma nervosa* extracts in both embodiments 26-33 and comparative example 22 is as follows: supercritical $CO_2$ extraction method is adopted, and the specific process is as follows: 500 g of *Lucuma nervosa* puree is put into a supercritical extraction device, and an extraction solvent is carbon dioxide; a water bath is turned on, a temperature of the supercritical extraction device is set at 40° C., $CO_2$ is introduced, and the air in the supercritical extraction device is replaced by $CO_2$, a compressor is turned on, a pressure in the supercritical extraction device is adjusted to 6 Mpa, and an extraction time is 2.5 h to obtain light yellow viscous oil, then dried with anhydrous sodium sulfate to obtain the *Lucuma nervosa* extract.

Embodiments 1-12

The components and contents of the *Lucuma nervosa* essences in embodiments 1-12 are shown in Table 3. The unit is part(s) by weight.

TABLE 3

| Component | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 | Embodiment 11 | Embodiment 12 |
|---|---|---|---|---|---|---|---|---|---|---|---|---|
| Butyraldehyde | 0.05 | 0.05 | 0.05 | 0.05 | 0.05 | 0.05 | 0.05 | 0.05 | 0.05 | 0.05 | 0.05 | 0.05 |
| 2-methylpropanol | 2.5 | 2.5 | 2.5 | 2.5 | 2.5 | 2.5 | 2.5 | 2.5 | 2.5 | 2.5 | 2.5 | 2.5 |
| 3-methyl-butyraldehyde | 0.25 | 0.25 | 0.25 | 0.25 | 0.25 | 0.25 | 0.25 | 0.25 | 0.25 | 0.25 | 0.25 | 0.25 |
| Trans-2-pentenal | 0.15 | 0.15 | 0.15 | 0.15 | 0.15 | 0.15 | 0.15 | 0.15 | 0.15 | 0.15 | 0.15 | 0.15 |
| Valeraldehyde | 0.2 | 0.2 | 0.2 | 0.2 | 0.2 | 0.2 | 0.2 | 0.2 | 0.2 | 0.2 | 0.2 | 0.2 |
| 2-methyl-1-butanol | 3 | 3 | 3 | 3 | 3 | 3 | 3 | 3 | 3 | 3 | 3 | 3 |
| Hexaldehyde | 0.5 | 0.5 | 0.5 | 0.5 | 0.5 | 0.5 | 0.5 | 0.5 | 0.5 | 0.5 | 0.5 | 0.5 |
| 3-mercapto-3-methyl-1-butanol | 0.5 | 0.5 | 0.5 | 0.5 | 0.5 | 0.5 | 0.5 | 0.5 | 0.5 | 0.5 | 0.5 | 0.5 |
| 2-methylthioethanol | 0.1 | 0.1 | 0.1 | 0.1 | 0.1 | 0.1 | 0.1 | 0.1 | 0.1 | 0.1 | 0.1 | 0.1 |
| Hexanol | 0.15 | 0.15 | 0.15 | 0.15 | 0.15 | 0.15 | 0.15 | 0.15 | 0.15 | 0.15 | 0.15 | 0.15 |
| Trans-2-octenal | 0.3 | 0.3 | 0.3 | 0.3 | 0.3 | 0.3 | 0.3 | 0.3 | 0.3 | 0.3 | 0.3 | 0.3 |
| Benzaldehyde | 0.4 | 0.4 | 0.4 | 0.4 | 0.4 | 0.4 | 0.4 | 0.4 | 0.4 | 0.4 | 0.4 | 0.4 |
| Dimethyl trisulfide | 0.25 | 0.25 | 0.25 | 0.25 | 0.25 | 0.25 | 0.25 | 0.25 | 0.25 | 0.25 | 0.25 | 0.25 |
| Octylaldehyde | 0.5 | 0.5 | 0.5 | 0.5 | 0.5 | 0.5 | 0.5 | 0.5 | 0.5 | 0.5 | 0.5 | 0.5 |
| 2-ethylhexanol | 0.1 | 0.1 | 0.1 | 0.1 | 0.1 | 0.1 | 0.1 | 0.1 | 0.1 | 0.1 | 0.1 | 0.1 |
| Limonene | 0.15 | 0.15 | 0.15 | 0.15 | 0.15 | 0.15 | 0.15 | 0.15 | 0.15 | 0.15 | 0.15 | 0.15 |
| Cis-4-decenal | 0.15 | 0.15 | 0.15 | 0.15 | 0.15 | 0.15 | 0.15 | 0.15 | 0.15 | 0.15 | 0.15 | 0.15 |
| Nonanal | 0.25 | 0.25 | 0.25 | 0.25 | 0.25 | 0.25 | 0.25 | 0.25 | 0.25 | 0.25 | 0.25 | 0.25 |
| (E,Z)-2,6-nonadienal | 0.1 | 0.1 | 0.1 | 0.1 | 0.1 | 0.1 | 0.1 | 0.1 | 0.1 | 0.1 | 0.1 | 0.1 |
| (Z,Z)-3,6-nonadienol | 0.05 | 0.05 | 0.05 | 0.05 | 0.05 | 0.05 | 0.05 | 0.05 | 0.05 | 0.05 | 0.05 | 0.05 |
| Decanal | 0.25 | 0.25 | 0.25 | 0.25 | 0.25 | 0.25 | 0.25 | 0.25 | 0.25 | 0.25 | 0.25 | 0.25 |
| Trans-2-decenal | 0.1 | 0.1 | 0.1 | 0.1 | 0.1 | 0.1 | 0.1 | 0.1 | 0.1 | 0.1 | 0.1 | 0.1 |
| Ethyl decanoate | 0.15 | 0.15 | 0.15 | 0.15 | 0.15 | 0.15 | 0.15 | 0.15 | 0.15 | 0.15 | 0.15 | 0.15 |
| Methyl 3,7-dimethyl-6-octenoate | 0.5 | — | 0.1 | 0.2 | 0.25 | 0.3 | 0.4 | 0.04 | 0.1 | 0.24 | 0.3 | 0.4 |
| 3-(methylthio)propyl butyrate | — | 0.5 | 0.4 | 0.3 | 0.25 | 0.2 | 0.1 | 0.06 | 0.15 | 0.36 | 0.45 | 0.6 |
| Salad oil | 89.35 | 89.35 | 89.35 | 89.35 | 89.35 | 89.35 | 89.35 | 89.75 | 89.6 | 89.25 | 89.1 | 88.85 |

Embodiments 13-25

The components and contents of the *Lucuma nervosa* essences in embodiments 13-25 are shown in Table 4. The unit is part(s) by weight.

TABLE 4

| Component | Embodiment 13 | Embodiment 14 | Embodiment 15 | Embodiment 16 | Embodiment 17 | Embodiment 18 | Embodiment 19 | Embodiment 20 | Embodiment 21 | Embodiment 22 | Embodiment 23 | Embodiment 24 | Embodiment 25 |
|---|---|---|---|---|---|---|---|---|---|---|---|---|---|
| Butyraldehyde | — | 0.05 | 0.05 | 0.05 | 0.05 | 0.05 | 0.05 | 0.05 | 0.05 | 0.05 | 0.05 | 0.01 | 0.5 |
| 2-methyl-propanol | 2.5 | 2.5 | 2.5 | 2.5 | 2.5 | 2.5 | 2.5 | 2.5 | 2.5 | 2.5 | 2.5 | 10 | 1 |
| 3-methylbutyraldehyde | 0.25 | 0.25 | 0.25 | 0.25 | 0.25 | 0.25 | 0.25 | 0.25 | 0.25 | 0.25 | 0.25 | 0.1 | 1 |
| Trans-2-pentenal | 0.15 | — | 0.15 | 0.15 | 0.15 | 0.15 | 0.15 | 0.15 | 0.15 | 0.15 | 0.15 | 0.05 | 0.5 |
| Valeraldehyde | 0.2 | 0.2 | 0.2 | 0.2 | 0.2 | 0.2 | 0.2 | 0.2 | 0.2 | 0.2 | 0.2 | 1 | 0.1 |
| 2-methyl-1-butanol | 3 | 3 | 3 | 3 | 3 | 6 | 1 | 3 | 3 | 3 | 3 | 6 | 1 |
| Hexaldehyde | 0.5 | 0.5 | 0.5 | 0.5 | 0.5 | 0.5 | 0.5 | 0.5 | 0.5 | 0.5 | 0.5 | 0.1 | 2 |
| 3-mercapto-3-methyl-1-butanol | 0.5 | 0.5 | 0.5 | 0.5 | 0.5 | 0.5 | 0.5 | 1 | 0.2 | 0.5 | 0.5 | 0.2 | 1 |
| 2-methylthio-ethanol | 0.1 | 0.1 | 0.1 | 0.1 | 0.1 | 0.1 | 0.1 | 0.1 | 0.1 | 0.5 | 0.02 | 0.5 | 0.02 |
| Hexanol | 0.15 | 0.15 | 0.15 | 0.15 | 0.15 | 0.15 | 0.15 | 0.15 | 0.15 | 0.15 | 0.15 | 0.05 | 1 |
| Trans-2-octenal | 0.3 | 0.3 | 0.3 | 0.3 | 0.3 | 0.3 | 0.3 | 0.3 | 0.3 | 0.3 | 0.3 | 0.05 | 1 |
| Benzaldehyde | 0.4 | 0.4 | — | 0.4 | 0.4 | 0.4 | 0.4 | — | 0.4 | 0.4 | 0.4 | 0.1 | 1 |
| Dimethyl trisulfide | 0.25 | 0.25 | 0.25 | 0.25 | 0.25 | 0.25 | 0.25 | 0.25 | 0.25 | 0.25 | 0.25 | 1 | 0.01 |
| Octylaldehyde | 0.5 | 0.5 | 0.5 | 0.5 | 0.5 | 0.5 | 0.5 | 0.5 | 0.5 | 0.5 | 0.5 | 2 | 0.1 |
| 2-ethylhexanol | 0.1 | 0.1 | 0.1 | 0.1 | 0.1 | 0.1 | 0.1 | 0.1 | 0.1 | 0.1 | 0.1 | 0.05 | 1 |
| Limonene | 0.15 | 0.15 | 0.15 | — | 0.15 | 0.15 | 0.15 | 0.15 | — | 0.15 | 0.15 | 0.05 | 0.5 |
| Cis-4-decenal | 0.15 | 0.15 | 0.15 | 0.15 | 0.15 | 0.15 | 0.15 | 0.15 | 0.15 | 0.15 | 0.15 | 0.05 | 1 |
| Nonanal | 0.25 | 0.25 | 0.25 | 0.25 | 0.25 | 0.25 | 0.25 | 0.25 | 0.25 | 0.25 | 0.25 | 0.05 | 1 |
| (E,Z)-2,6-nonadienal | 0.1 | 0.1 | 0.1 | 0.1 | 0.1 | 0.1 | 0.1 | 0.1 | 0.1 | 0.1 | 0.1 | 0.02 | 1 |

TABLE 4-continued

| Component | Embodiment 13 | Embodiment 14 | Embodiment 15 | Embodiment 16 | Embodiment 17 | Embodiment 18 | Embodiment 19 | Embodiment 20 | Embodiment 21 | Embodiment 22 | Embodiment 23 | Embodiment 24 | Embodiment 25 |
|---|---|---|---|---|---|---|---|---|---|---|---|---|---|
| (Z,Z)-3,6-nonadienol | 0.05 | 0.05 | 0.05 | 0.05 | 0.05 | 0.05 | 0.05 | 0.05 | 0.05 | 0.05 | 0.05 | 0.01 | 0.3 |
| Decanal | 0.25 | 0.25 | 0.25 | 0.25 | 0.25 | 0.25 | 0.25 | 0.25 | 0.25 | 0.25 | 0.25 | 0.01 | 1 |
| Trans-2-decenal | 0.1 | 0.1 | 0.1 | 0.1 | 0.1 | 0.1 | 0.1 | 0.1 | 0.1 | 0.1 | 0.1 | 0.01 | 0.5 |
| Ethyl decanoate | 0.15 | 0.15 | 0.15 | 0.15 | — | 0.15 | 0.15 | 0.15 | 0.15 | — | 0.15 | 0.05 | 1 |
| Methyl 3,7-dimethyl-6-octenoate | 0.1 | 0.24 | 0.3 | 0.4 | 0.4 | 0.1 | 0.24 | 0.3 | 0.4 | 0.4 | 0.24 | 0.1 | 0.1 |
| 3-(methylthio)propyl butyrate | 0.15 | 0.36 | 0.45 | 0.6 | 0.6 | 0.15 | 0.36 | 0.45 | 0.6 | 0.6 | 0.36 | 0.4 | 0.4 |
| Salad oil | 89.65 | 89.4 | 89.5 | 89 | 89 | 86.6 | 91.25 | 89 | 89.3 | 88.6 | 89.33 | 78.04 | 81.97 |

Embodiments 26-33

The components and contents of the *Lucuma nervosa* essences in embodiments 26-33 are shown in Table 5. The unit is part(s) by weight.

TABLE 5

| Component | Embodiment 26 | Embodiment 27 | Embodiment 28 | Embodiment 29 | Embodiment 30 | Embodiment 31 | Embodiment 32 | Embodiment 33 |
|---|---|---|---|---|---|---|---|---|
| *Lucuma nervosa* extract | 99 | 99.6 | 99.9 | 99.2 | 99.5 | 99.4 | 99.1 | 99.4 |
| Methyl 3,7-dimethyl-6-octenoate | 1 | 0.4 | 0.1 | — | — | 0.1 | 0.4 | 0.5 |
| 3-(methylthio)propyl butyrate | — | — | — | 0.8 | 0.5 | 0.5 | 0.5 | 0.1 |

Comparative Example 1

Compared with embodiment 10, comparative example 1 only differs in that the amount of the methyl 3,7-dimethyl-6-octenoate is 0.05 parts by weight, the 3-(methylthio)propyl butyrate is not added, and the amount of the salad oil is 89.8 parts by weight. Other condition parameters are the same as those in embodiment 10.

Comparative Example 2

Compared with embodiment 10, comparative example 2 only differs in that the methyl 3,7-dimethyl-6-octenoate is not added, the amount of the 3-(methylthio)propyl butyrate is 0.05 parts by weight, and the amount of the salad oil is 89.8 parts by weight. Other condition parameters are the same as those in embodiment 10.

Comparative Example 3

Compared with embodiment 10, comparative example 3 only differs in that the amount of the methyl 3,7-dimethyl-6-octenoate is 1.2 parts by weight, the 3-(methylthio)propyl butyrate is not added, and the amount of the salad oil is 88.65 parts by weight. Other condition parameters are the same as those in embodiment 10.

Comparative Example 4

Compared with embodiment 10, comparative example 4 only differs in that the methyl 3,7-dimethyl-6-octenoate is not added, the amount of the 3-(methylthio)propyl butyrate is 1.2 parts by weight, and the amount of the salad oil is 88.65 parts by weight. Other condition parameters are the same as those in embodiment 10.

Comparative Example 5

Compared with embodiment 10, comparative example 5 only differs in that the methyl 3,7-dimethyl-6-octenoate and the 3-(methylthio)propyl butyrate are not added, and the amount of the salad oil is 89.85 parts by weight. Other condition parameters are the same as those in embodiment 10.

Comparative Example 6

Compared with embodiment 10, comparative example 6 only differs in that 0.24 parts by weight of the methyl 3,7-dimethyl-6-octenoate is replaced by 0.2 parts by weight of the methyl 3-nonenoate, and the amount of the salad oil is 89.29 parts by weight. Other condition parameters are the same as those in embodiment 10.

Comparative Example 7

Compared with embodiment 10, comparative example 7 only differs in that 0.24 parts by weight of the methyl 3,7-dimethyl-6-octenoate is replaced by 0.5 parts by weight of the methyl 3-nonenoate, and the amount of the salad oil is 88.99 parts by weight. Other condition parameters are the same as those in embodiment 10.

Comparative Example 8

Compared with embodiment 10, comparative example 8 only differs in that 0.24 parts by weight of the methyl 3,7-dimethyl-6-octenoate is replaced by 1 part by weight of the methyl 3-nonenoate, and the amount of the salad oil is 88.49 parts by weight. Other condition parameters are the same as those in embodiment 10.

Comparative Example 9

Compared with embodiment 10, comparative example 9 only differs in that 0.36 parts by weight of the 3-(methylthio) propyl butyrate is replaced by 0.2 parts by weight of the 3-(methylthio)propyl acetate, and the amount of the salad oil is 89.41 parts by weight. Other condition parameters are the same as those in embodiment 10.

Comparative Example 10

Compared with embodiment 10, comparative example 10 only differs in that 0.36 parts by weight of the 3-(methylthio) propyl butyrate is replaced by 0.5 parts by weight of the 3-(methylthio)propyl acetate, and the amount of the salad oil is 89.11 parts by weight. Other condition parameters are the same as those in embodiment 10.

Comparative Example 11

Compared with embodiment 10, comparative example 11 only differs in that 0.36 parts by weight of the 3-(methylthio) propyl butyrate is replaced by 1 part by weight of the 3-(methylthio)propyl acetate, and the amount of the salad oil is 88.61 parts by weight. Other condition parameters are the same as those in embodiment 10.

Comparative Example 12

Compared with embodiment 9, comparative example 12 only differs in that the 2-methyl-1-butanol is not added, and the amount of the salad oil is 92.6 parts by weight. Other condition parameters are the same as those in embodiment 9.

Comparative Example 13

Compared with embodiment 10, comparative example 13 only differs in that the 3-mercapto-3-methyl-1-butanol is not added, and the amount of the salad oil is 89.75 parts by weight. Other condition parameters are the same as those in embodiment 10.

Comparative Example 14

Compared with embodiment 11, comparative example 14 only differs in that the 2-methylthio ethanol is not added, and the amount of the salad oil is 89.2 parts by weight. Other condition parameters are the same as those in embodiment 11.

Comparative Example 15

Compared with embodiment 12, comparative example 15 only differs in that the hexaldehyde is not added, and the amount of the salad oil is 89.35 parts by weight. Other condition parameters are the same as those in embodiment 12.

Comparative Example 16

Compared with embodiment 12, comparative example 16 only differs in that the octylaldehyde is not added, and the amount of the salad oil is 89.35 parts by weight. Other condition parameters are the same as those in embodiment 12.

Comparative Example 17

Compared with embodiment 9, comparative example 17 only differs in that 0.2 parts by weight of the valeraldehyde is replaced by 0.2 parts by weight of the isovaleraldehyde. Other condition parameters are the same as those in embodiment 9.

Comparative Example 18

Compared with embodiment 10, comparative example 18 only differs in that 0.5 parts by weight of the hexaldehyde is replaced by 0.5 parts by weight of the 2-methylvaleraldehyde. Other condition parameters are the same as those in embodiment 10.

Comparative Example 19

Compared with embodiment 11, comparative example 19 only differs in that 0.5 parts by weight of the octylaldehyde is replaced by 0.5 parts by weight of the 2-methylheptanal. Other condition parameters are the same as those in embodiment 11.

Comparative Example 20

Compared with embodiment 12, comparative example 20 only differs in that 0.25 parts by weight of the nonanal is replaced by 0.25 parts by weight of the 2-methyloctanal. Other condition parameters are the same as those in embodiment 12.

Comparative Example 21

Compared with embodiment 12, comparative example 21 only differs in that 0.25 parts by weight of the decanal is replaced by 0.25 parts by weight of the 2-methylnonanal. Other condition parameters are the same as those in embodiment 12.

Comparative Example 22

The *Lucuma nervosa* extract of embodiment 26 is used as a *Lucuma nervosa* essence, and the *Lucuma nervosa* aroma enhancer is not added.

Effect Example 1

Sensory tests are performed on the aromas of *Lucuma nervosa* essences of embodiments 1-33 and comparative examples 1-22. The average scores of the sensory evaluation results obtained by testing three times using the above sensory evaluation method are shown in Table 6.

TABLE 6

| | Items | Aroma fidelity (0-10 points) | Aroma coordination (0-10 points) | Lucuma nervosa characteristic aroma (0-10 points) | Public preference (0-10 points) |
|---|---|---|---|---|---|
| Scores | Embodiment 1 | 8.3 | 7.5 | 7.6 | 7.4 |
| | Embodiment 2 | 8.2 | 8.3 | 8.4 | 7.9 |
| | Embodiment 3 | 8.6 | 8.6 | 8.5 | 8.1 |
| | Embodiment 4 | 8.9 | 9.1 | 9.1 | 8.8 |
| | Embodiment 5 | 8.7 | 8.5 | 8.9 | 8.7 |
| | Embodiment 6 | 8.6 | 8.7 | 8.8 | 8.8 |
| | Embodiment 7 | 7.9 | 8.3 | 8.1 | 7.8 |
| | Embodiment 8 | 8.5 | 8.4 | 8.3 | 7.9 |
| | Embodiment 9 | 8.7 | 8.6 | 8.6 | 8.3 |
| | Embodiment 10 | 9.3 | 9.1 | 9.4 | 9.2 |
| | Embodiment 11 | 8.6 | 8.5 | 9.1 | 8.8 |
| | Embodiment 12 | 8.1 | 7.9 | 8.2 | 8.4 |
| | Embodiment 13 | 8.4 | 8.1 | 8.1 | 8.3 |
| | Embodiment 14 | 8.3 | 8.1 | 8.2 | 8.2 |
| | Embodiment 15 | 8.7 | 8.8 | 8.5 | 8.4 |
| | Embodiment 16 | 8.2 | 8.2 | 8.5 | 8.3 |
| | Embodiment 17 | 8.1 | 8.1 | 8.2 | 8.3 |
| | Embodiment 18 | 8.6 | 8.7 | 9.1 | 9.1 |
| | Embodiment 19 | 8.2 | 8.8 | 8.6 | 8.8 |
| | Embodiment 20 | 8.2 | 8.3 | 9.1 | 8.5 |
| | Embodiment 21 | 8.2 | 8.5 | 8.7 | 8.3 |
| | Embodiment 22 | 8.8 | 8.4 | 8.6 | 8.4 |
| | Embodiment 23 | 8.2 | 8.7 | 9.1 | 9.1 |
| | Embodiment 24 | 8.5 | 8.3 | 8.4 | 8.2 |
| | Embodiment 25 | 8.7 | 8.2 | 8.6 | 8.1 |
| | Embodiment 26 | 7.9 | 7.8 | 7.9 | 8.1 |
| | Embodiment 27 | 8.1 | 8.2 | 8.4 | 8.3 |
| | Embodiment 28 | 7.9 | 7.9 | 8.1 | 7.8 |
| | Embodiment 29 | 8.1 | 7.8 | 7.9 | 7.8 |
| | Embodiment 30 | 8.4 | 8.2 | 7.9 | 8.2 |
| | Embodiment 31 | 8.6 | 8.5 | 8.4 | 8.3 |
| | Embodiment 32 | 9.1 | 8.8 | 8.9 | 8.7 |
| | Embodiment 33 | 8.6 | 8.3 | 8.6 | 8.3 |
| | Comparative example 1 | 6.7 | 7.2 | 7.4 | 6.6 |
| | Comparative example 2 | 6.9 | 7.2 | 7.2 | 6.7 |
| | Comparative example 3 | 6.3 | 6.5 | 7.1 | 6.4 |
| | Comparative example 4 | 6.4 | 6.6 | 7.1 | 6.2 |
| | Comparative example 5 | 6.8 | 7.1 | 7.3 | 6.5 |
| | Comparative example 6 | 6.9 | 6.7 | 6.9 | 6.6 |
| | Comparative example 7 | 7.1 | 6.7 | 6.1 | 6.8 |
| | Comparative example 8 | 6.2 | 6.6 | 6.9 | 6.7 |
| | Comparative example 9 | 5.9 | 6.7 | 6.2 | 6.4 |
| | Comparative example 10 | 6.9 | 6.3 | 6.2 | 6.9 |
| | Comparative example 11 | 6.7 | 6.6 | 6.4 | 5.6 |
| | Comparative example 12 | 7.2 | 7.1 | 6.8 | 6.5 |
| | Comparative example 13 | 6.4 | 7.1 | 6.6 | 6.4 |
| | Comparative example 14 | 7.3 | 6.2 | 6.4 | 6.5 |
| | Comparative example 15 | 6.3 | 7.3 | 5.7 | 5.9 |
| | Comparative example 16 | 7.3 | 6.3 | 6.6 | 6.7 |
| | Comparative example 17 | 7.3 | 7.3 | 7.4 | 6.6 |
| | Comparative example 18 | 7.2 | 7.3 | 5.5 | 6.5 |
| | Comparative example 19 | 6.9 | 6.6 | 6.6 | 7.1 |
| | Comparative example 20 | 7.1 | 6.9 | 6.2 | 7.2 |
| | Comparative example 21 | 7.2 | 6.1 | 6.1 | 6.6 |
| | Comparative example 22 | 6.6 | 5.8 | 6.2 | 6.6 |

The aromas of the *Lucuma nervosa* essences prepared in embodiments 1-33 and comparative examples 1-22 are evaluated and analyzed by the sensory evaluation group. The results show that the aroma fidelity and aroma coordination of the *Lucuma nervosa* essences prepared by comparative examples 1-22 are poor, the *Lucuma nervosa* characteristic aroma is not obvious, and the public preference is not high (see Table 6). The aroma fidelity, aroma coordination and the *Lucuma nervosa* characteristic aroma of the *Lucuma nervosa* essences prepared by embodiments 1-33 are all improved, and the public preference is higher.

When the substrate is the *Lucuma nervosa* aroma composition, for example, the methyl 3,7-dimethyl-6-octenoate or the 3-(methylthio)propyl butyrate is added in embodiments 1 and 2 respectively. Compared with comparative example 5, the aroma fidelity, aroma coordination, *Lucuma nervosa* characteristic aroma are all improved, and the public preference is higher, but the enhancement effect of *Lucuma nervosa* essence aroma is limited.

When the substrate is the *Lucuma nervosa* aroma composition, for example, the methyl 3,7-dimethyl-6-octenoate and the 3-(methylthio)propyl butyrate are simultaneously added in embodiments 4, 10 and 11, and when the mass percentage of the *Lucuma nervosa* aroma enhancer in the *Lucuma nervosa* essence is 0.5%-0.75%, and the ratio of parts by weight of the methyl 3,7-dimethyl-6-octenoate to the 3-(methylthio)propyl butyrate is 1:1.5, the enhancement effect of aroma is more obvious, and the aromas of original samples are more improved so as to obtain satisfactory products.

When the substrate is the *Lucuma nervosa* aroma composition, it can be seen from embodiment 10 and embodiments 13-17 that when the *Lucuma nervosa* essence contains the butyraldehyde, trans-2-pentenal, benzaldehyde, limonene and ethyl decanoate, the aroma fidelity, aroma coordination and *Lucuma nervosa* characteristic aroma of the *Lucuma nervosa* essence are better.

When the substrate is the *Lucuma nervosa* aroma composition, it can be seen from embodiments 18-23 that when the adding ratio of the 2-methyl-1-butanol is 3%, 6% and 1% respectively, the aroma fidelity, aroma coordination, *Lucuma nervosa* characteristic aroma and public preference of the *Lucuma nervosa* essence are relatively good. When the adding ratio of the 2-methyl-1-butanol is 3%, the *Lucuma nervosa* essence has optimal results. Similarly, when the adding ratio of the 3-mercapto-3-methyl-1-butanol and 2-methylthio ethanol is 0.5% and 0.1% respectively, the *Lucuma nervosa* essence has more optimized sensory evaluation data.

It can be seen from comparative examples 1-2 that when the adding ratio of the methyl 3,7-dimethyl-6-octenoate or the 3-(methylthio)propyl butyrate is 0.05%, the aroma fidelity and aroma coordination of the *Lucuma nervosa* essences are not changed significantly. In comparative examples 3-4, when the adding ratio of the methyl 3,7-dimethyl-6-octenoate or the 3-(methylthio)propyl butyrate is 1.2%, the aroma fidelity and aroma coordination of the *Lucuma nervosa* essences are worse than that of comparative example 5.

It can be seen from comparative examples 6-11 that when the methyl 3,7-dimethyl-6-octenoate is replaced by the methyl 3-nonenoate, the aroma fidelity, aroma coordination, *Lucuma nervosa* characteristic aroma and public preference of the *Lucuma nervosa* essences decrease significantly. When the 3-(methylthio)propyl butyrate is replaced by the 3-(methylthio)propyl acetate, the sensory indexes such as aroma fidelity, aroma coordination and *Lucuma nervosa* characteristic aroma also significantly decrease.

It can be seen from comparative examples 12-16 that when the *Lucuma nervosa* essences are not added with the 2-methyl-1-butanol, 3-mercapto-3-methyl-1-butanol, 2-methylthio ethanol, hexaldehyde or octylaldehyde, the sensory indexes such as aroma fidelity, aroma coordination and *Lucuma nervosa* characteristic aroma of the *Lucuma nervosa* essences decrease significantly.

It can be seen from comparative examples 17-21 that in the *Lucuma nervosa* essences, when the valeraldehyde is replaced by the isovaleraldehyde, the hexaldehyde is replaced by the 2-methylvaleraldehyde, the octylaldehyde is replaced by the 2-methylheptanal, or the nonanal is replaced by the 2-methyloctanal, the sensory indexes such as aroma fidelity, aroma coordination and *Lucuma nervosa* characteristic aroma of the *Lucuma nervosa* essences decrease significantly.

When the substrate is the *Lucuma nervosa* extract, the *Lucuma nervosa* essence prepared by comparative example 22 has poor aroma fidelity and aroma coordination, the *Lucuma nervosa* characteristic aroma is not obvious, and the public preference is not high. The aroma fidelity, aroma coordination, *Lucuma nervosa* characteristic aroma of the *Lucuma nervosa* essences prepared by embodiments 26-33 are all improved, and the public preference is higher.

The methyl 3,7-dimethyl-6-octenoate or the 3-(methylthio)propyl butyrate is added in embodiments 26-30 respectively. Compared with comparative example 22, the aroma fidelity, aroma coordination, *Lucuma nervosa* characteristic aroma are all improved, and the public preference is higher, but the enhancement effect of *Lucuma nervosa* essence aroma is limited. However, embodiments 31-33 with the methyl 3,7-dimethyl-6-octenoate and the 3-(methylthio)propyl butyrate added simultaneously have obvious aroma enhancement effect. In embodiment 32, when the ratio of parts by weight of the methyl 3,7-dimethyl-6-octenoate to the 3-(methylthio)propyl butyrate is 4:5, the *Lucuma nervosa* essence prepared by adding the methyl 3,7-dimethyl-6-octenoate and the 3-(methylthio)propyl butyrate has optimal aroma fidelity and aroma coordination, the *Lucuma nervosa* characteristic aroma is the most obvious, and the aromas of original samples are more improved so as to obtain satisfactory products.

Effect Example 2—an Application of the *Lucuma nervosa* Essence Obtained by the Present Invention in Preparing Biscuits with a *Lucuma nervosa* Flavor First, 0.5 g of baking soda is dissolved in 50 g of water, then 30 g of sugar powder, 30 g of egg liquid, 25 g of butter and other ingredients are added, and 0.5 g of the *Lucuma nervosa* essences prepared by comparative example 5, embodiment 4 and embodiment 10 are added respectively, heated and stirred evenly in a water bath, then 200 g of cake powder is added and stirred. The stirring is conducted for 13 min until the dough is uniform, moderately soft, moderately elastic and not sticky. The prepared dough is kept for 20 min. The prepared dough is put in a biscuit mold to make small biscuits with a uniform thickness and a moderate size, and put onto a baking tray. The small dough biscuits are put in an oven, the baking conditions includes a surface fire of 195° C., a bottom fire of 165° C., and a baking time of 10 min. The biscuits are baked and molded and placed at room temperature to naturally cool down, and finally a biscuit product is obtained. Sensory evaluation is performed on the biscuits made from the *Lucuma nervosa* essences of comparative example 5, embodiment 4 and embodiment 10 by using the above sensory evaluation method. The average scores of three sensory evaluation results are shown in Table 7.

TABLE 7

| Items | Scores | | |
| --- | --- | --- | --- |
| | Comparative example 5 | Embodiment 4 | Embodiment 10 |
| Aroma fidelity (0-10 points) | 6.6 | 9.1 | 9.2 |
| Aroma coordination (0-10 points) | 7.3 | 8.9 | 9.1 |
| *Lucuma nervosa* characteristic aroma (0-10 points) | 7.5 | 9.2 | 9.3 |
| Public preference (0-10 points) | 6.8 | 8.6 | 9.4 |

It can be seen from the table that the aroma fidelity, aroma coordination, *Lucuma nervosa* characteristic aroma and public preference of the biscuits made from the *Lucuma nervosa* essences of embodiments 4 and 10 reach 9.1, 8.9, 9.2, 8.6 and 9.2, 9.1, 9.3, 9.4, respectively. Both of them have similar application effect. Compared with comparative example 5, the aroma fidelity, aroma coordination and *Lucuma nervosa* characteristic aroma of the biscuits made from the *Lucuma nervosa* essences of embodiment 4 and 10 are significantly improved.

Effect Example 3—an Application of the *Lucuma nervosa* Essence Obtained by the Present Invention in Preparing Beverages with a *Lucuma nervosa* Flavor The fresh *Lucuma nervosa* with suitable maturity is peeled and cored, and the flesh is cut into small strips. The processed *Lucuma nervosa* flesh is put into hot water and cooked for 2 min, processed with a multi-function blender to make a *Lucuma nervosa* puree, and then finely ground with a colloid mill to make the *Lucuma nervosa* puree fine and smooth without fiber. A certain amount of the *Lucuma nervosa* puree (the content is 20%), 7% white granulated sugar and a 0.15% xanthan gum solution are mixed, and added with 0.5 g of the *Lucuma nervosa* essences prepared by comparative example 5, embodiment 4 and embodiment 10 respectively, stirred to mix the *Lucuma nervosa* puree and the white granulated sugar evenly. The prepared *Lucuma nervosa* beverage is put into a cleaned glass bottle, presealed and allowed to stand for about 1 h at a constant temperature of 70° C., then taken out and cooled to room temperature to finally obtain the beverage. Sensory evaluation is performed on the beverages made from the *Lucuma nervosa* essences of comparative example 5, embodiment 4 and embodiment 10 by using the above sensory evaluation method. The average scores of three sensory evaluation results are shown in Table 8.

TABLE 8

| Items | Scores | | |
|---|---|---|---|
| | Comparative example 5 | Embodiment 4 | Embodiment 10 |
| Aroma fidelity (0-10 points) | 6.8 | 8.7 | 9.3 |
| Aroma coordination (0-10 points) | 7.1 | 8.8 | 9.2 |
| Lucuma nervosa characteristic aroma (0-10 points) | 7.2 | 8.6 | 9.3 |
| Public preference (0-10 points) | 6.9 | 8.5 | 9.5 |

It can be seen from the table that the aroma fidelity, aroma coordination, *Lucuma nervosa* characteristic aroma and public preference of the beverages made from the *Lucuma nervosa* essences of embodiments 4 and 10 reach 8.7, 8.8, 8.6, 8.5 and 9.3, 9.2, 9.3, 9.5, respectively. Compared with comparative example 5, the aroma fidelity, aroma coordination and *Lucuma nervosa* characteristic aroma of the beverages made from the *Lucuma nervosa* essences of embodiment 4 and 10 are significantly improved. The beverage made from the *Lucuma nervosa* essence of embodiment 10 has the optimal effect.

Effect Example 4—an Application of the *Lucuma nervosa* Essence Obtained by the Present Invention in Preparing Breads with a *Lucuma nervosa* Flavor 300 g of flour, 4 g of a yeast and 15 g of sugar are mixed, and added with 0.1 g of the *Lucuma nervosa* essences prepared by comparative example 5, embodiment 4 and embodiment 10 respectively in 200 mL of warm water, stirred and dissolved. 15 g of butter and 5 g of salt are added to continue stirring well. The mixture is fermented under a sealed condition at room temperature for 2 h, and refrigerated in a freezer for 3 h. The dough is taken out for a secondary fermentation for 40 min. The surface of the bread is sprinkled with the flour, made with a few cuts by a sharp knife or scissor, put into a 230° C. oven and baked for 30 min to finally obtain a bread product. Sensory evaluation is performed on the breads made from the *Lucuma nervosa* essences of comparative example 5, embodiment 4 and embodiment 10 by using the above sensory evaluation method. The average scores of three sensory evaluation results are shown in Table 9.

TABLE 9

| Items | Scores | | |
|---|---|---|---|
| | Comparative example 5 | Embodiment 4 | Embodiment 10 |
| Aroma fidelity (0-10 points) | 6.6 | 8.9 | 9.2 |
| Aroma coordination (0-10 points) | 6.8 | 8.8 | 9.5 |
| Lucuma nervosa characteristic aroma (0-10 points) | 7.1 | 9.0 | 9.3 |
| Public preference (0-10 points) | 7.3 | 8.5 | 9.5 |

It can be seen from the table that the aroma fidelity, aroma coordination, *Lucuma nervosa* characteristic aroma and public preference of the breads made from the *Lucuma nervosa* essences of embodiments 4 and 10 reach 8.9, 8.8, 9.0, 8.5 and 9.2, 9.5, 9.3, 9.5, respectively. Compared with comparative example 5, the aroma fidelity, aroma coordination and *Lucuma nervosa* characteristic aroma of the breads made from the *Lucuma nervosa* essences of embodiment 4 and 10 are significantly improved. The bread made from the *Lucuma nervosa* essence of embodiment 10 has the optimal effect.

Effect Example 5

The aromas of the *Lucuma nervosa* essences prepared by embodiment 4 and comparative example 5 are evaluated by an ultra-fast gas chromatography electronic nose. Subsequently, the aromas of the *Lucuma nervosa* essences prepared by embodiment 4 and comparative example 5 are evaluated after being placed for one month, three months and six months respectively. The only difference between embodiment 4 and comparative example 5 is that the *Lucuma nervosa* aroma enhancer is not added in comparative example 5.

Detection parameters: Heracles electronic nose (Alpha Mos, France, Toulouse) is used; the mobile phase is hydrogen with a flow rate of 1 mL/min; the injection volume is 5,000 μL; the injection port temperature is 200° C.; the incubation temperature is 50° C.; the incubation time is 20 s; the trap temperature is 40° C.; the trap time is 50 s; the temperature of the hydrogen ion flame detector is 260° C.

Temperature programmed process: the column temperature is balanced at 50° C. for 2 s, then raised to 80° C. at a rate of 1° C./s, finally raised to 250° C. at a rate of 3° C./s and balanced for 21 s, and the acquisition time is 110 s.

The diagram showing radar of sensory of the *Lucuma nervosa* essence prepared by embodiment 4 detected by the e-nose system is shown in FIG. 1.

Figure 2:
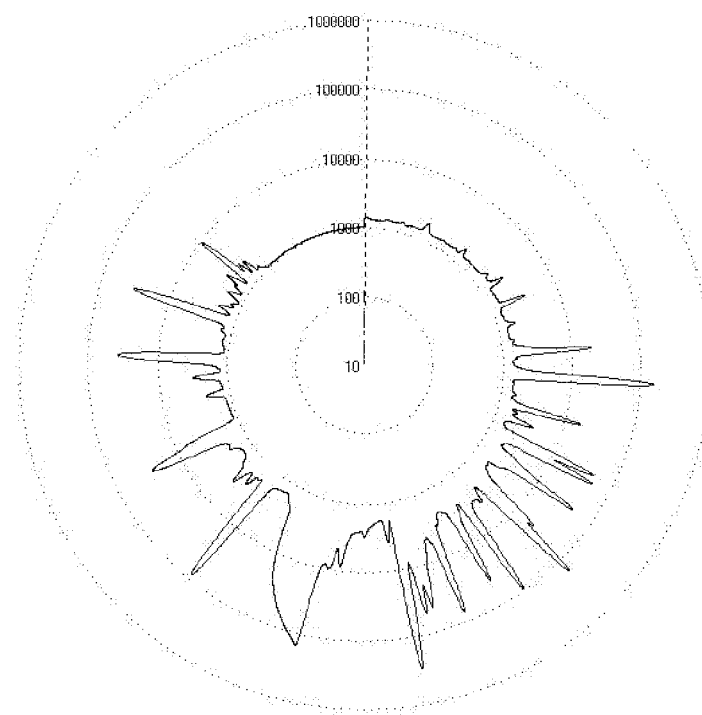
FIGS. 2, 4, and 6 are diagrams showing radar of sensory of the *Lucuma nervosa* essence prepared by embodiment 4 placed for one month, three months and six months respectively detected by the e-nose system.
Figure 4:
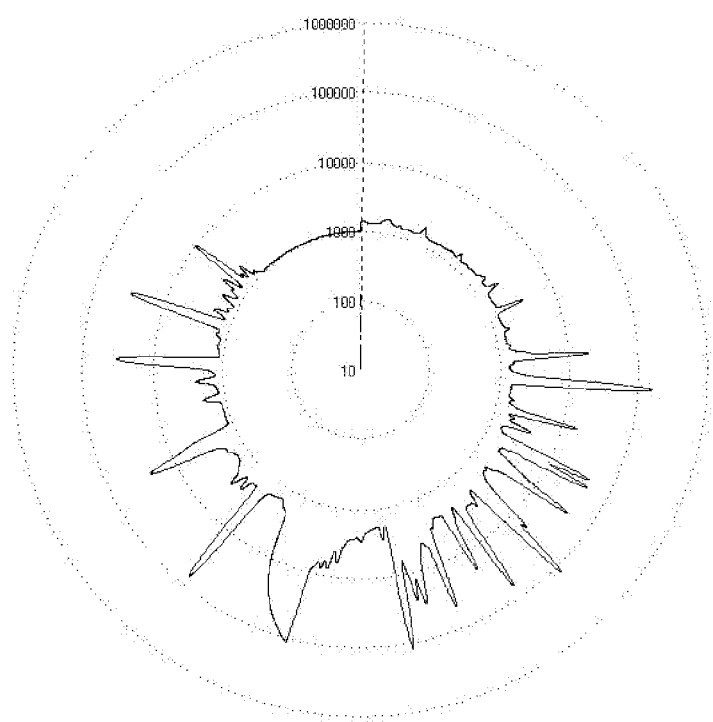
Figure 6:
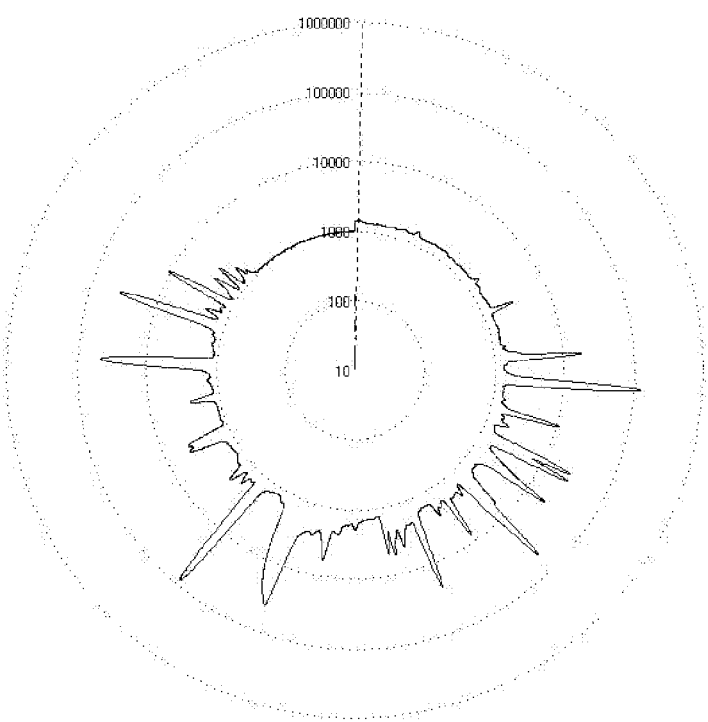

The diagrams showing radar of sensory of the *Lucuma nervosa* essence prepared by embodiment 4 placed for one month, three months and six months detected by the e-nose system are respectively shown in FIGS. 2, 4, and 6.

Figure 3:
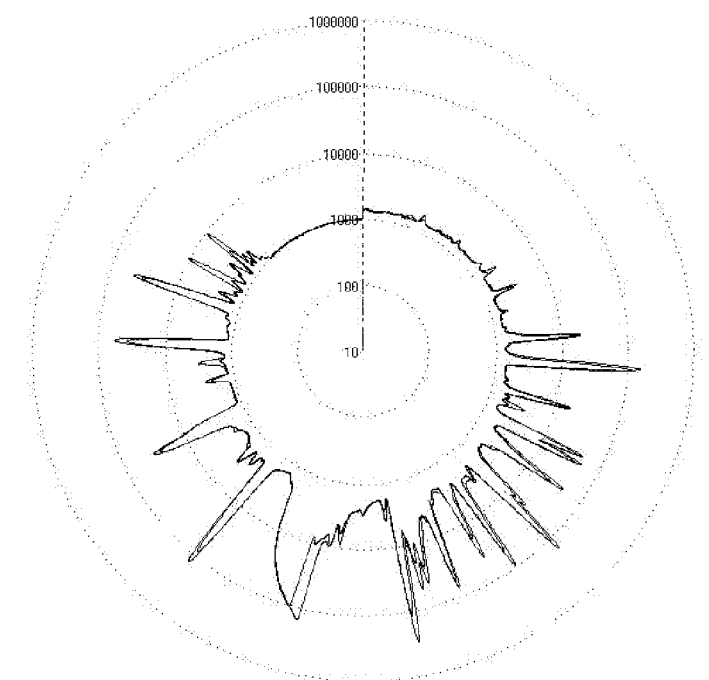
FIGS. 3, 5 and 7 are superimposed diagrams showing radar of sensory of the product prepared by embodiment 4 and the product prepared by embodiment 4 placed for one month, three months and six months respectively detected by the e-nose system.
Figure 5:
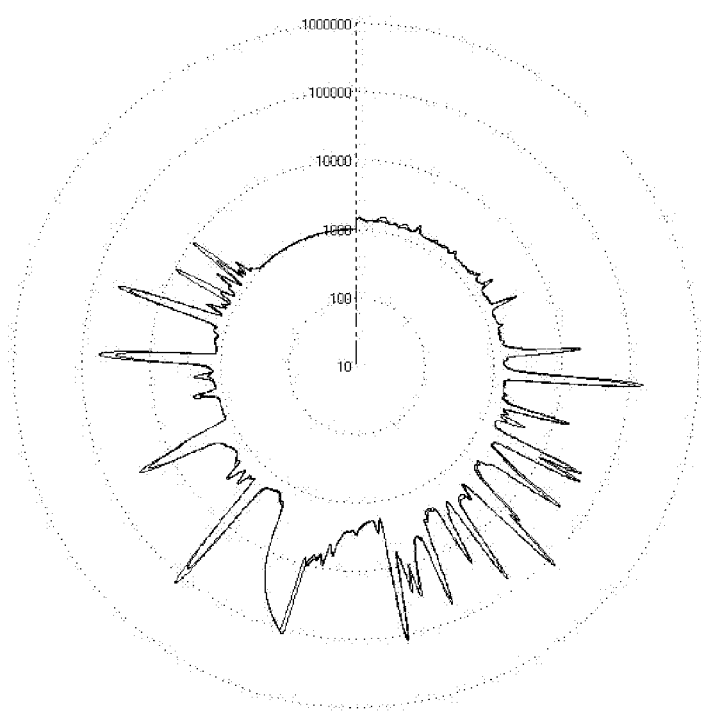
Figure 7:
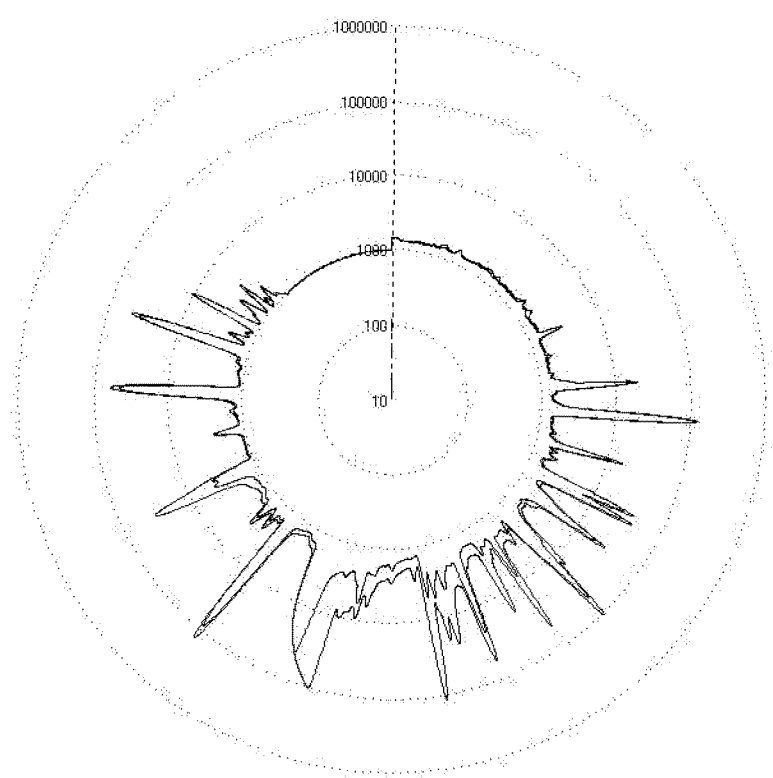

The superimposed diagrams showing radar of sensory of the product prepared by embodiment 4 and the product prepared by embodiment 4 placed for one month, three months and six months detected by the e-nose system are respectively shown in FIGS. 3, 5 and 7.

Figure 8:
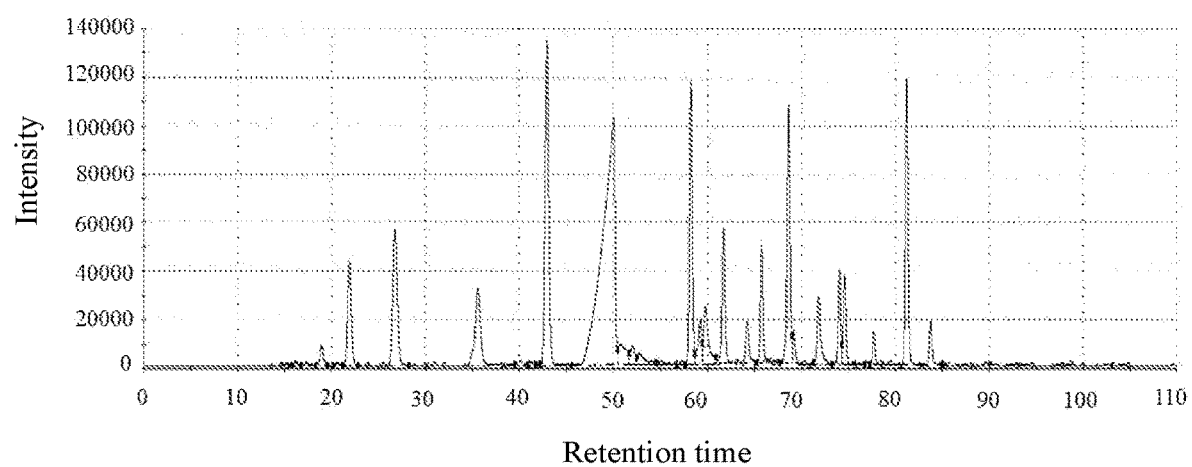
FIG. 8 is a gas chromatogram showing the aroma of the *Lucuma nervosa* essence prepared by embodiment 4 detected by the e-nose system.

The gas chromatogram showing the aroma of the *Lucuma nervosa* essence prepared by embodiment 4 detected by the e-nose system is shown in FIG. 8.

Figure 9:
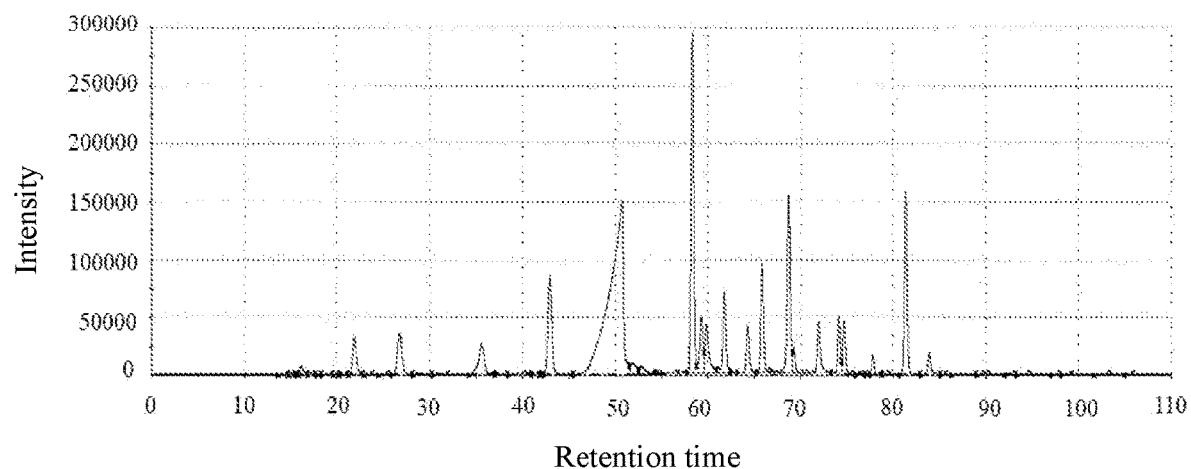
FIGS. 9, 11, and 13 are gas chromatograms showing the aromas of the *Lucuma nervosa* essence prepared by embodiment 4 placed for one month, three months and six months respectively detected by the e-nose system.
Figure 11:
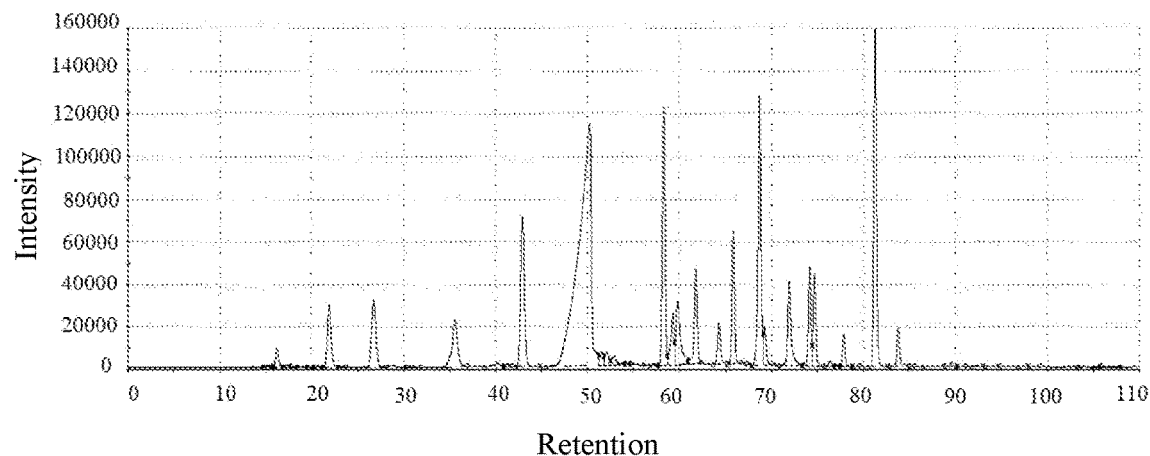
Figure 13:
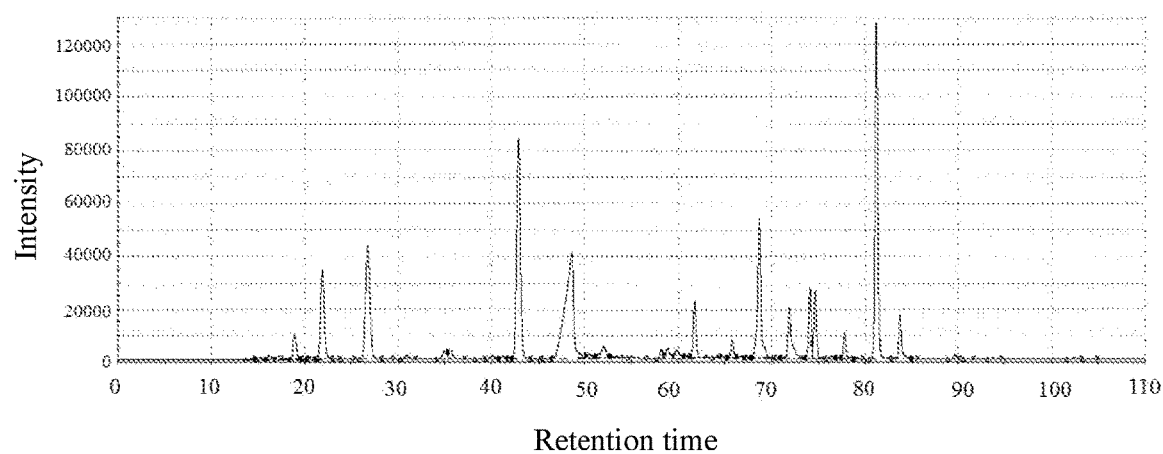

The gas chromatograms showing the aromas of the *Lucuma nervosa* essence prepared by embodiment 4 placed for one month, three months and six months detected by the e-nose system are respectively shown in FIGS. 9, 11, and 13.

Figure 10:
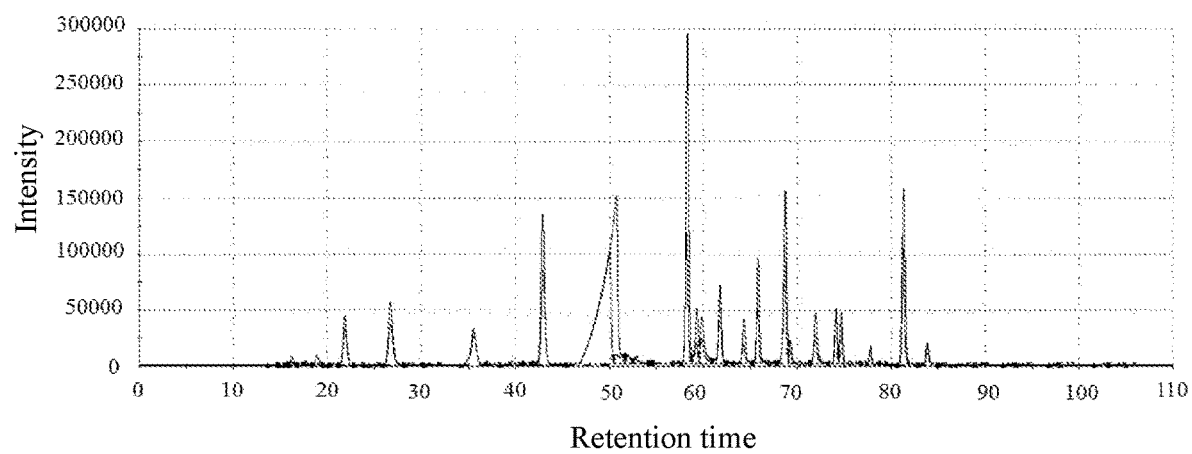
FIGS. 10, 12 and 14 are superimposed gas chromatograms showing the aromas of the product prepared by embodiment 4 and the product prepared by embodiment 4 placed for one month, three months and six months respectively detected by the e-nose system.
Figure 12:
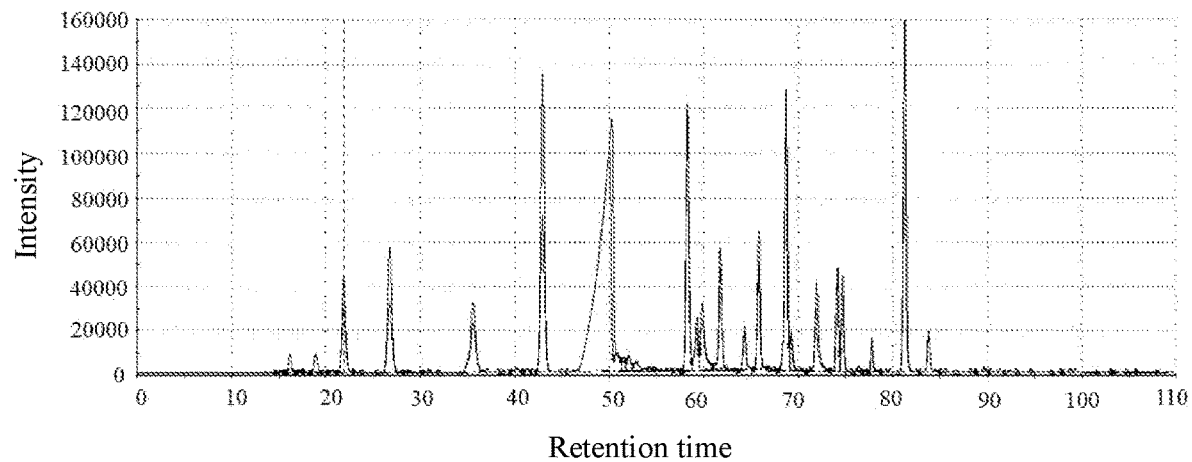
Figure 14:
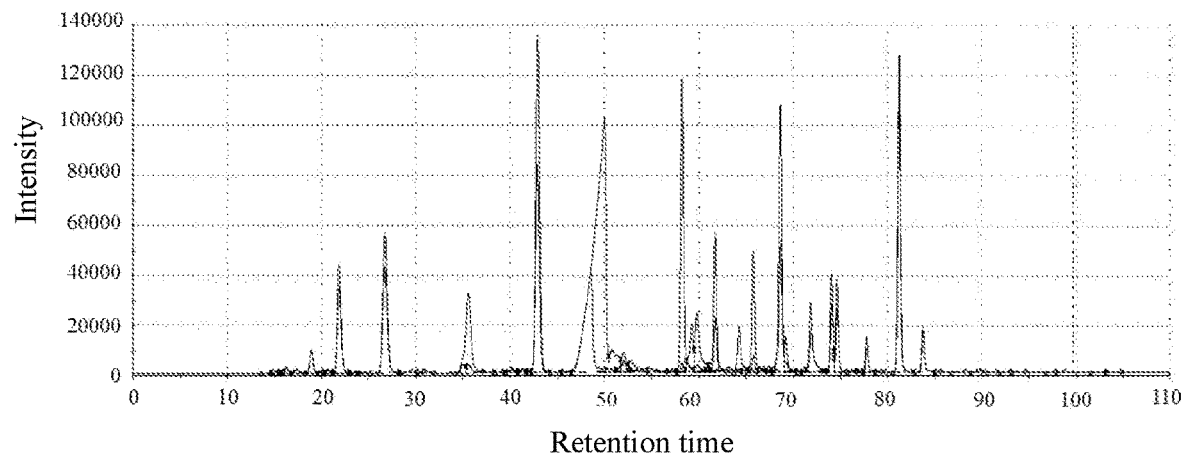

The superimposed gas chromatograms showing the aromas of the product prepared by embodiment 4 and the product prepared by embodiment 4 placed for one month, three months and six months detected by the e-nose system are respectively shown in FIGS. 10, 12 and 14.

Figure 15:
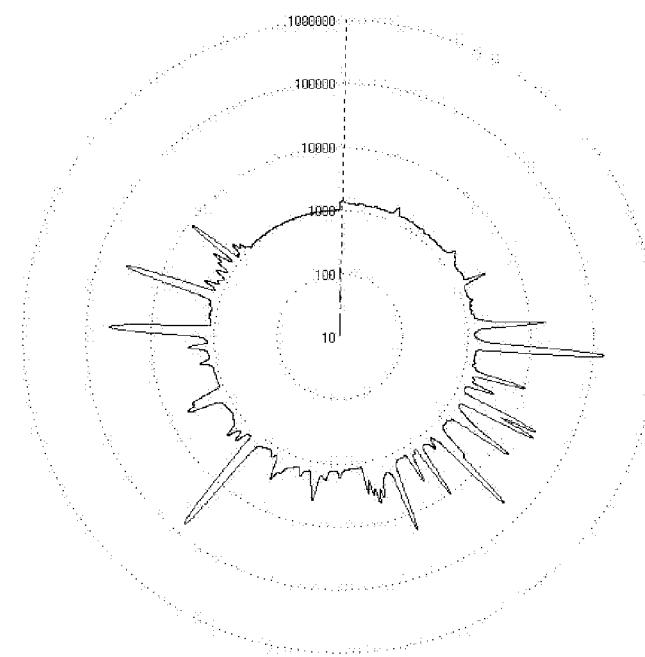
FIG. 15 is a diagram showing radar of sensory of the *Lucuma nervosa* essence prepared by comparative example 5 of the present invention detected by the e-nose system.

The diagram showing radar of sensory of the *Lucuma nervosa* essence prepared by comparative example 5 detected by the e-nose system is shown in FIG. 15.

Figure 16:
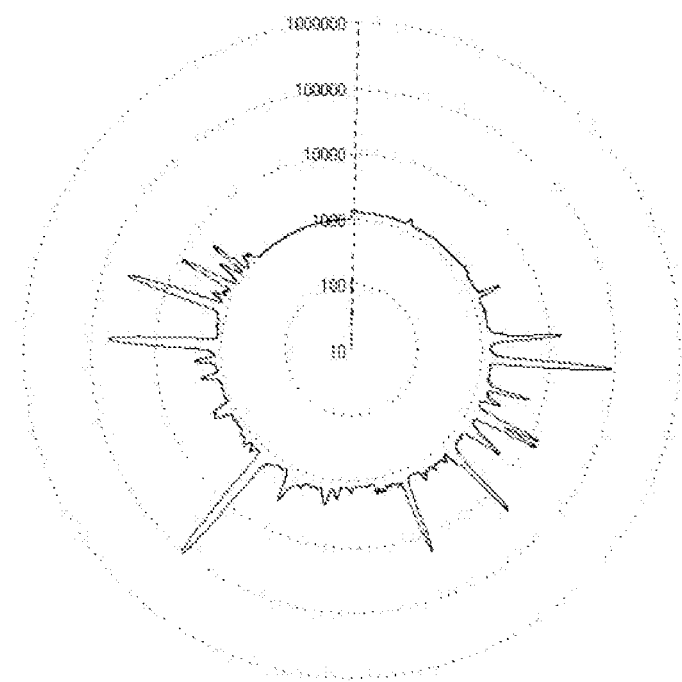
FIGS. 16, 18, and 20 are diagrams showing radar of sensory of the *Lucuma nervosa* essence prepared by comparative example 5 placed for one month, three months and six months respectively detected by the e-nose system.
Figure 18:
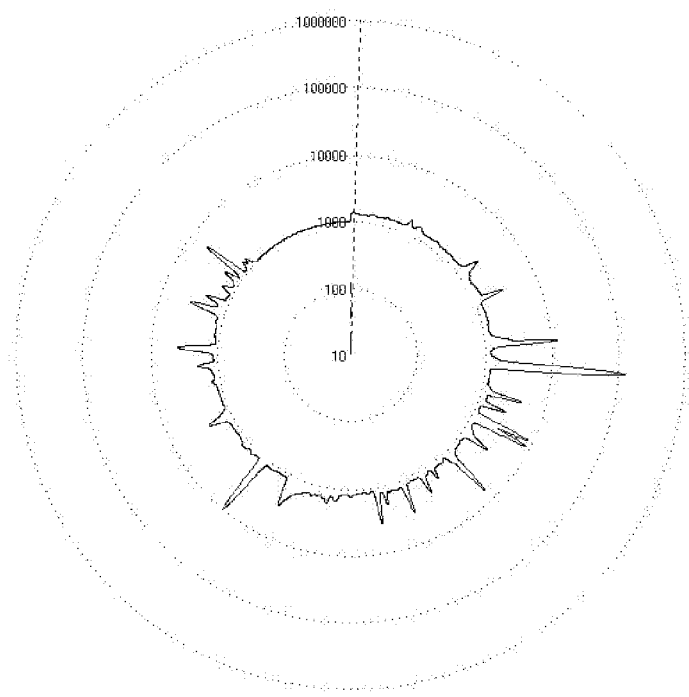
Figure 20:
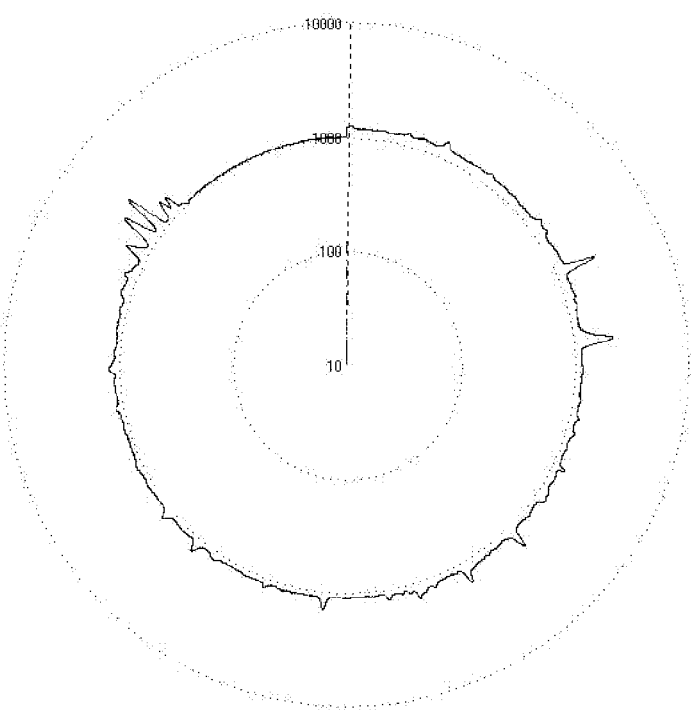

The diagrams showing radar of sensory of the *Lucuma nervosa* essence prepared by comparative example 5 placed for one month, three months and six months detected by the e-nose system are respectively shown in FIGS. 16, 18, and 20.

Figure 17:
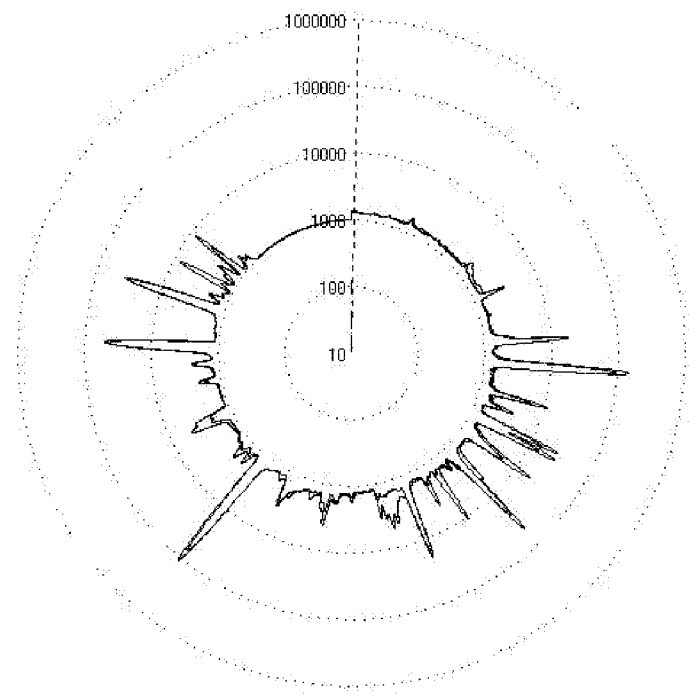
FIGS. 17, 19 and 21 are superimposed diagrams showing radar of sensory of the product prepared by comparative example 5 and the product prepared by comparative example 5 placed for one month, three months and six months respectively detected by the e-nose system.
Figure 19:
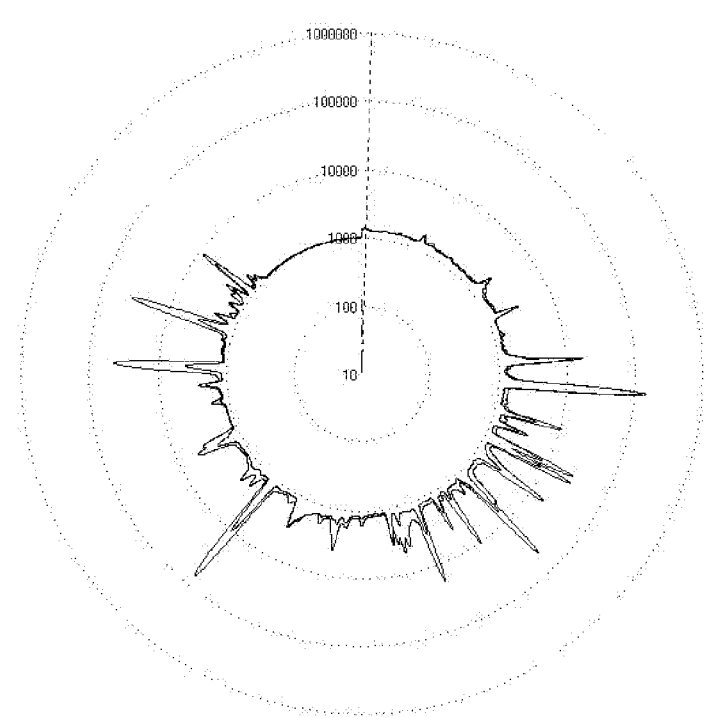
Figure 21:
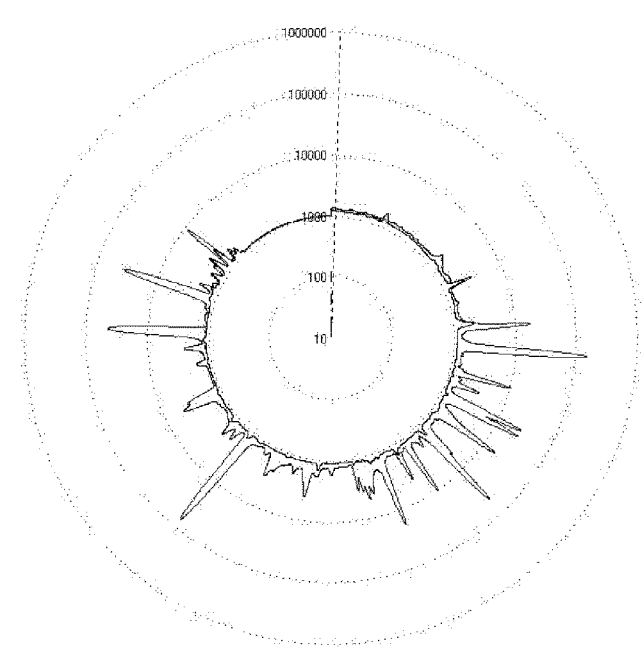

The superimposed diagrams showing radar of sensory of the product prepared by comparative example 5 and the product prepared by comparative example 5 placed for one month, three months and six months detected by the e-nose system are respectively shown in FIGS. 17, 19 and 21.

Figure 22:
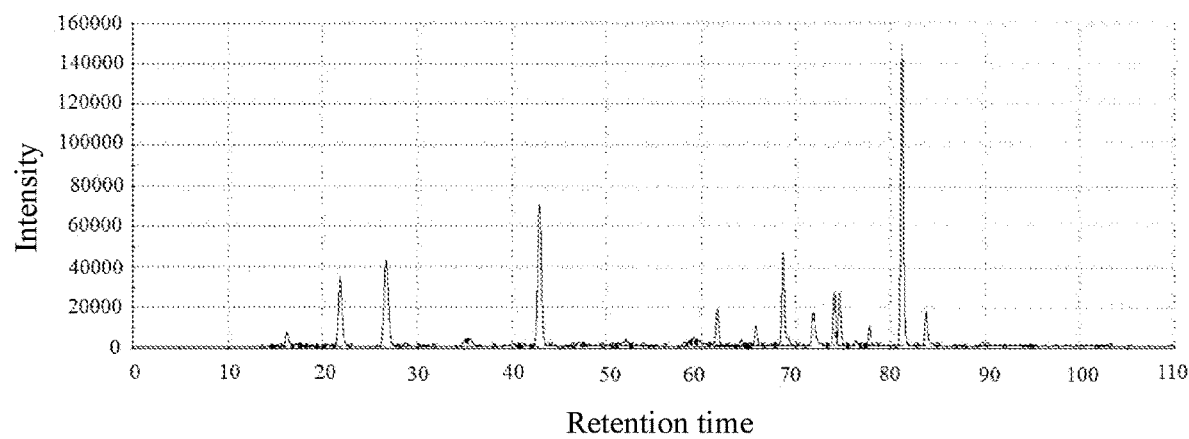
FIG. 22 is a gas chromatogram showing the aroma of the *Lucuma nervosa* essence prepared by comparative example 5 detected by the e-nose system.

The gas chromatogram showing the aroma of the *Lucuma nervosa* essence prepared by comparative example 5 detected by the e-nose system is shown in FIG. 22.

Figure 23:
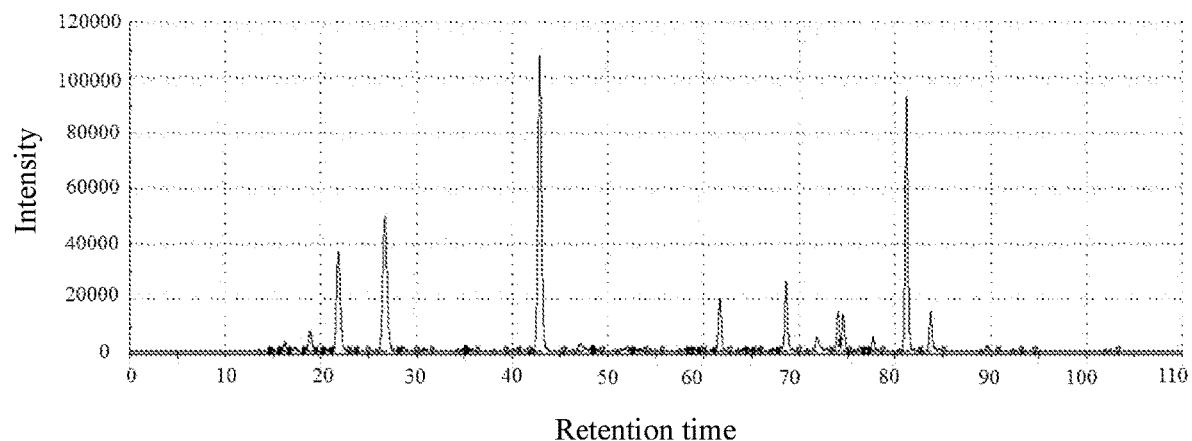
FIGS. 23, 25 and 27 are gas chromatograms showing the aromas of the *Lucuma nervosa* essence prepared by comparative example 5 placed for one month, three months and six months respectively detected by the e-nose system.
Figure 25:
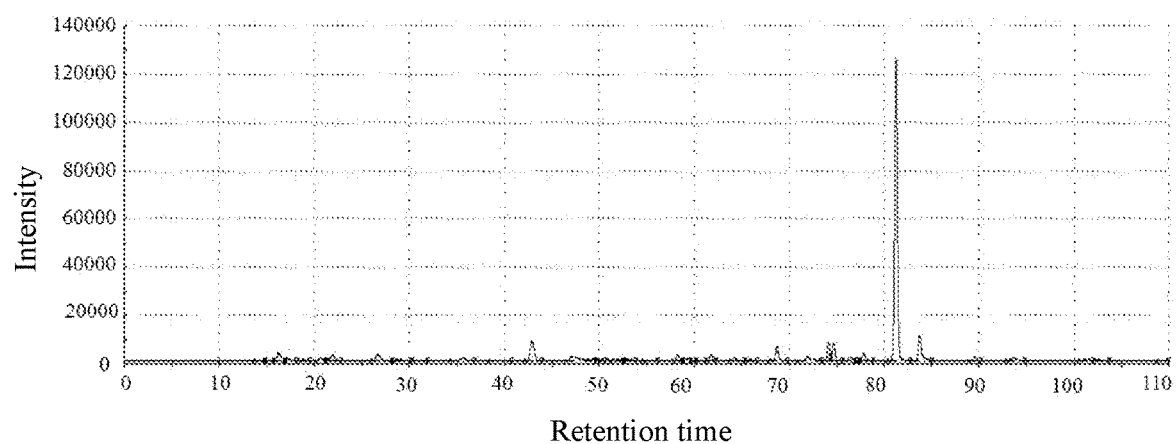
Figure 27:
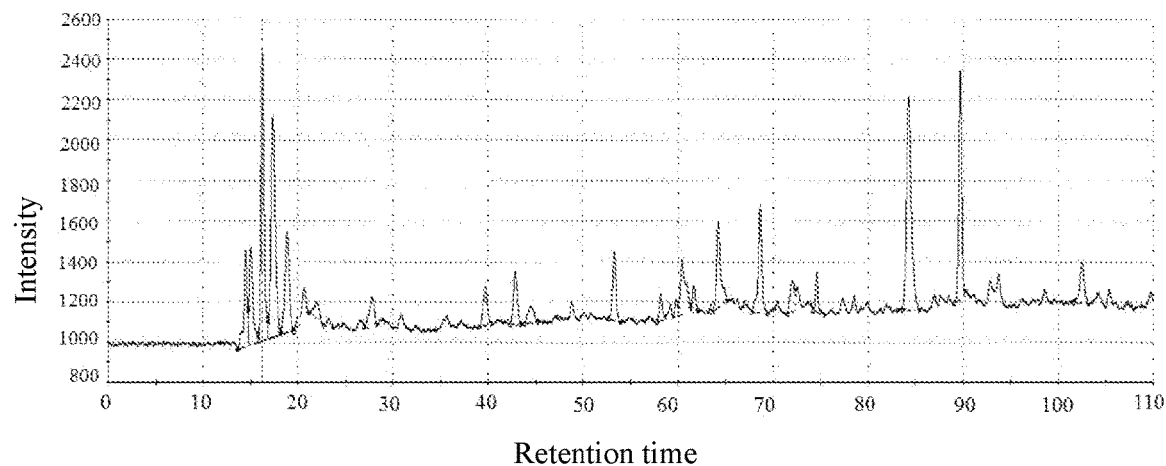

The gas chromatograms showing the aromas of the *Lucuma nervosa* essence prepared by comparative example 5 placed for one month, three months and six months detected by the e-nose system are respectively shown in FIGS. 23, 25 and 27.

Figure 24:
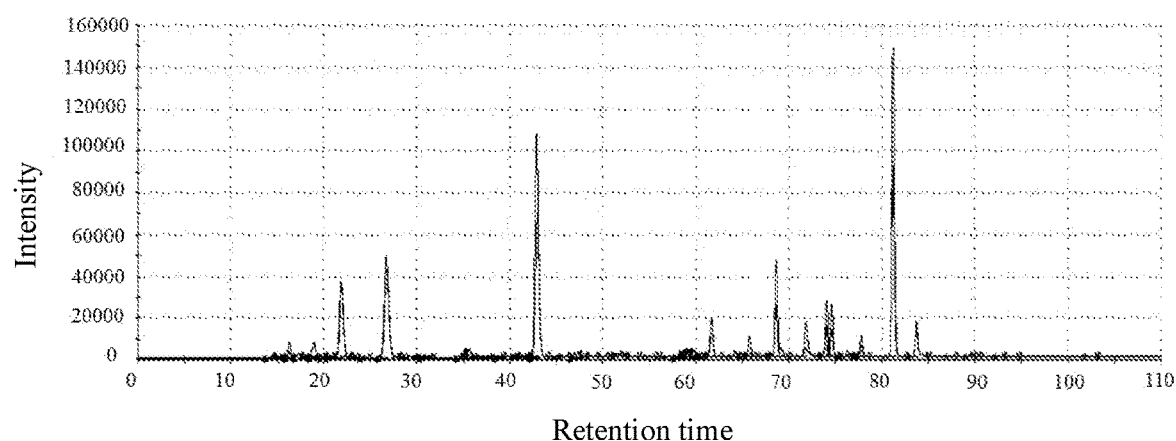
FIGS. 24, 26 and 28 are superimposed gas chromatograms showing the aromas of the product prepared by comparative example 5 and the product prepared by embodiment 4 placed for one month, three months and six months respectively detected by the e-nose system.
Figure 26:
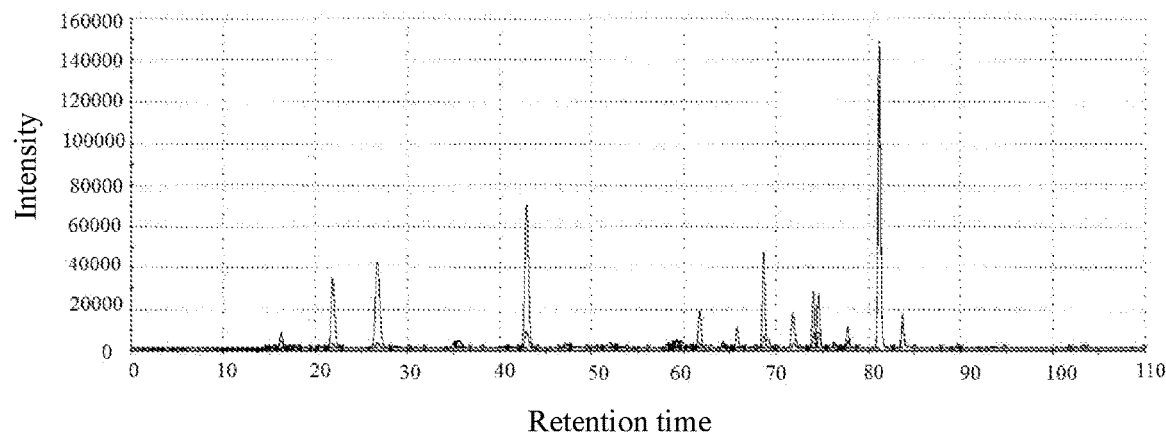
Figure 28:
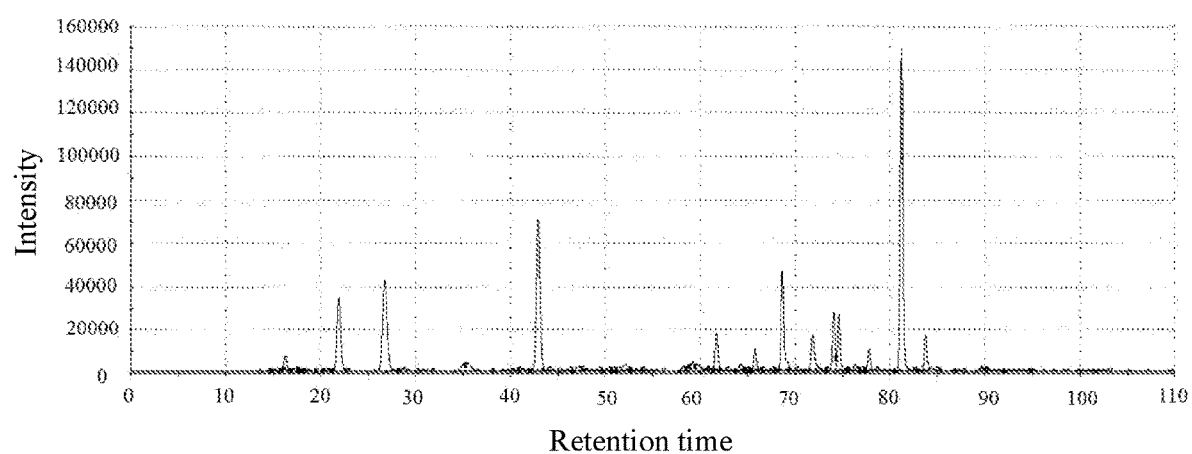

The superimposed gas chromatograms showing the aromas of the product prepared by comparative example 5 and the product prepared by comparative example 5 placed for one month, three months and six months detected by the e-nose system are respectively shown in FIGS. 24, 26 and 28.

The result shows that the radar diagram and the gas chromatogram showing the aroma of the *Lucuma nervosa* essence prepared by embodiment 4 and the radar diagrams and the gas chromatograms showing the aromas of the *Lucuma nervosa* essence prepared by embodiment 4 placed for one month and three months have no difference basically.

The radar diagram and the gas chromatogram showing the aroma of the *Lucuma nervosa* essence prepared by embodiment 4 and the radar diagram and the gas chromatogram showing the aroma of the *Lucuma nervosa* essence prepared by embodiment 4 placed for six months have slight difference, but the aroma retention is obvious. The aroma retention and aroma stability of the *Lucuma nervosa* essences made by other embodiments are equivalent to that of embodiment 4. The radar diagram and the gas chromatogram showing the aroma of the *Lucuma nervosa* essence prepared by comparative example 5 and the radar diagram and the gas chromatogram showing the aroma of the *Lucuma nervosa* essence prepared by comparative example 5 placed for one month have slight difference, but the aroma retention is obvious. The radar diagram and the gas chromatogram showing the aroma of the *Lucuma nervosa* essence prepared by comparative example 5 and the radar diagram and the gas chromatogram showing the aroma of the *Lucuma nervosa* essence prepared by comparative example 5 placed for three and six months have significant difference, and the aroma retention is not obvious.

The result shows that the *Lucuma nervosa* essence added with the *Lucuma nervosa* aroma enhancer has better stability. Compared with the *Lucuma nervosa* essence without the addition of the *Lucuma nervosa* aroma enhancer, the addition of the methyl 3,7-dimethyl-6-octenoate and the 3-(methylthio)propyl butyrate can effectively improve the aroma retention and stability of the *Lucuma nervosa* essence.

Although the specific embodiments of the present invention are described above, those skilled in the art should understand that these are only examples, and variations or modifications can be made to these embodiments without departing from the principle and essence of the present invention. Therefore, the protection scope of the present invention is defined by the claims.

What is claimed is:

1. A *Lucuma nervosa* essence, comprising:
a substrate, wherein the substrate comprises at least one selected from the group consisting of a *Lucuma nervosa* extract and a *Lucuma nervosa* aroma composition, wherein when the substrate comprises the *Lucuma nervosa* extract, the extract is obtained from a *Lucuma nervosa* fruit, and wherein when the substrate comprises the *Lucuma nervosa* aroma composition, the *Lucuma nervosa* composition comprises a solvent, and the solvent comprises at least one selected from the group consisting of an alcohol solvent, an ester solvent and edible oil; and a *Lucuma nervosa* aroma enhancer, comprising at least one selected from the group consisting of methyl 3,7-dimethyl-6-octenoate and 3-(methylthio)propyl butyrate, wherein a mass percentage of the *Lucuma nervosa* aroma enhancer in the *Lucuma nervosa* essence is 0.08%-1.1%.

2. The *Lucuma nervosa* essence according to claim 1, wherein when the substrate is the *Lucuma nervosa* aroma composition, and the *Lucuma nervosa* aroma enhancer is the methyl 3,7-dimethyl-6-octenoate, the mass percentage of the *Lucuma nervosa* aroma enhancer in the *Lucuma nervosa* essence is 0.1%-1%;

when the substrate is the *Lucuma nervosa* aroma composition, and the *Lucuma nervosa* aroma enhancer is the 3-(methylthio)propyl butyrate, the mass percentage of the *Lucuma nervosa* aroma enhancer in the *Lucuma nervosa* essence is 0.1%-1%;

when the substrate is the *Lucuma nervosa* aroma composition, and the *Lucuma nervosa* aroma enhancer is the methyl 3,7-dimethyl-6-octenoate and the 3-(methylthio)propyl butyrate, the mass percentage of the *Lucuma nervosa* aroma enhancer in the *Lucuma nervosa* essence is 0.1%-1%; a mass ratio of the methyl 3,7-dimethyl-6-octenoate to the 3-(methylthio)propyl butyrate is 1:(5-0.2);

when the substrate is the *Lucuma nervosa* aroma composition, and the *Lucuma nervosa* aroma enhancer is the methyl 3,7-dimethyl-6-octenoate and the 3-(methylthio)propyl butyrate, an amount of the *Lucuma nervosa* aroma enhancer and the mass ratio of the methyl 3,7-dimethyl-6-octenoate to the 3-(methylthio)propyl butyrate are shown as the following numbers 1-10:

| Number | Mass ratio of the methyl 3,7-dimethyl-6-octenoate to the 3-(methylthio)propyl butyrate | Mass percentage of the *Lucuma nervosa* aroma enhancer in the *Lucuma nervosa* essence |
| --- | --- | --- |
| 1 | 1:4 | 0.5% |
| 2 | 1:1.5 | 0.5% |
| 3 | 1:1.5 | 0.1% |
| 4 | 1:1.5 | 0.25% |
| 5 | 1:1.5 | 0.6% |
| 6 | 1:1.5 | 0.75% |
| 7 | 1:1.5 | 1% |
| 8 | 1:1 | 0.5% |
| 9 | 1.5:1 | 0.5% |
| 10 | 1:0.25 | 0.5% | when the substrate is the *Lucuma nervosa* aroma composition, and a ratio of parts by weight of the methyl 3,7-dimethyl-6-octenoate to the 3-(methylthio)propyl butyrate is 1:1.5, the mass percentage of the *Lucuma nervosa* aroma enhancer in the *Lucuma nervosa* essence is 0.1%-1%.

3. The *Lucuma nervosa* essence according to claim 1, wherein when the substrate is the *Lucuma nervosa* extract, and the *Lucuma nervosa* aroma enhancer is the methyl 3,7-dimethyl-6-octenoate, the mass percentage of the *Lucuma nervosa* aroma enhancer in the *Lucuma nervosa* essence is 0.1%-1%;

when the substrate is the *Lucuma nervosa* extract, and the *Lucuma nervosa* aroma enhancer is the 3-(methylthio) propyl butyrate, the mass percentage of the *Lucuma nervosa* aroma enhancer in the *Lucuma nervosa* essence is 0.1%-1%;

when the substrate is the *Lucuma nervosa* extract, and the *Lucuma nervosa* aroma enhancer is the methyl 3,7-dimethyl-6-octenoate and the 3-(methylthio)propyl butyrate, the mass percentage of the *Lucuma nervosa* aroma enhancer in the *Lucuma nervosa* essence is 0.1%-1%; the mass ratio of the methyl 3,7-dimethyl-6-octenoate to the 3-(methylthio)propyl butyrate is 1:(5.5-0.15);

when the substrate is the *Lucuma nervosa* extract, and the mass ratio of the methyl 3,7-dimethyl-6-octenoate to the 3-(methylthio)propyl butyrate is 1:5, the mass percentage of the *Lucuma nervosa* aroma enhancer in the *Lucuma nervosa* essence is 0.6%;

when the substrate is the *Lucuma nervosa* extract, and a ratio of parts by weight of the methyl 3,7-dimethyl-6-octenoate to the 3-(methylthio)propyl butyrate is 1:1.25, the mass percentage of the *Lucuma nervosa* aroma enhancer in the *Lucuma nervosa* essence is 0.9%;

when the substrate is the *Lucuma nervosa* extract, and the ratio of parts by weight of the methyl 3,7-dimethyl-6-octenoate to the 3-(methylthio)propyl butyrate is 1:0.2, the mass percentage of the *Lucuma nervosa* aroma enhancer in the *Lucuma nervosa* essence is 0.6%.

4. The *Lucuma nervosa* essence according to claim 1, wherein when the substrate is the *Lucuma nervosa* extract, the *Lucuma nervosa* essence comprises the following components in parts by weight: 99-99.9 parts of the *Lucuma nervosa* extract and 0.1-1 part of the *Lucuma nervosa* aroma enhancer, a total amount of the *Lucuma nervosa* extract and the *Lucuma nervosa* aroma enhancer is 100 parts by weight;

the *Lucuma nervosa* extract is obtained by one method selected from the group consisting of a supercritical carbon dioxide ($CO_2$) extraction method, a steam distillation method and a solvent extraction method.

5. The *Lucuma nervosa* essence according to claim 1, wherein when the substrate is the *Lucuma nervosa* aroma composition, the *Lucuma nervosa* essence comprises the following components in parts by weight: 1-10 parts of 2-methylpropanol, 0.1-1 part of 3-methylbutyraldehyde, 0.1-1 part of valeraldehyde, 1-6 parts of 2-methyl-1-butanol, 0.1-2 parts of hexaldehyde, 0.2-1 part of 3-mercapto-3-methyl-1-butanol, 0.02-0.5 parts of 2-methylthio ethanol, 0.05-1 part of hexanol, 0.05-1 part of trans-2-octenal, 0.05-1 part of dimethyl trisulfide, 0.1-2 parts of octylaldehyde, 0.05-1 part of 2-ethylhexanol, 0.05-1 part of cis-4-decenal, 0.05-1 part of nonanal, 0.02-1 part of (E,Z)-2,6-nonadienal, 0.01-0.3 parts of (Z,Z)-3,6-nonadienol, 0.01-1 part of decanal, 0.01-0.5 parts of trans-2-decenal, 0.05-1 part of ethyl decanoate and 0.1-1 part of the *Lucuma nervosa* aroma enhancer;

the *Lucuma nervosa* essence further comprises at least one selected from the group consisting of butyraldehyde, trans-2-pentenal, benzaldehyde and limonene; an amount of the butyraldehyde is 0.01-0.5 parts by weight; an amount of the trans-2-pentenal is 0.05-0.5 parts by weight; an amount of the benzaldehyde is 0.1-1 part by weight; an amount of the limonene is 0.05-0.5 parts by weight;

when the *Lucuma nervosa* essence comprises the solvent, and the solvent comprises at least one selected from the group consisting of an alcohol solvent, an ester solvent and edible oil; the alcohol solvent is at least one selected from the group consisting of ethanol, propylene glycol and glycerol; the ester solvent is glyceryl triacetate; the edible oil is salad oil; and an amount of the solvent is 80-93 parts by weight.

6. A preparation method of the *Lucuma nervosa* essence, comprising the following step: mixing the components of the *Lucuma nervosa* essence according to claim 1.

7. The preparation method of the *Lucuma nervosa* essence according to claim 6, wherein when the substrate is the *Lucuma nervosa* extract, the *Lucuma nervosa* essence comprises the following components in parts by weight: 99-99.9 parts of the *Lucuma nervosa* extract and 0.1-1 part of the *Lucuma nervosa* aroma enhancer, a total amount of the *Lucuma nervosa* extract and the *Lucuma nervosa* aroma enhancer is 100 parts by weight;

the *Lucuma nervosa* extract is obtained by one method selected from the group consisting of a supercritical carbon dioxide ($CO_2$) extraction method, a steam distillation method and a solvent extraction method.

8. The preparation method of the *Lucuma nervosa* essence according to claim 6, wherein when the substrate is the *Lucuma nervosa* aroma composition, the *Lucuma nervosa* essence comprises the following components in parts by weight: 1-10 parts of 2-methylpropanol, 0.1-1 part of 3-methylbutyraldehyde, 0.1-1 part of valeraldehyde, 1-6 parts of 2-methyl-1-butanol, 0.1-2 parts of hexaldehyde, 0.2-1 part of 3-mercapto-3-methyl-1-butanol, 0.02-0.5 parts of 2-methylthio ethanol, 0.05-1 part of hexanol, 0.05-1 part of trans-2-octenal, 0.05-1 part of dimethyl trisulfide, 0.1-2 parts of octylaldehyde, 0.05-1 part of 2-ethylhexanol, 0.05-1 part of cis-4-decenal, 0.05-1 part of nonanal, 0.02-1 part of (E,Z)-2,6-nonadienal, 0.01-0.3 parts of (Z,Z)-3,6-nonadienol, 0.01-1 part of decanal, 0.01-0.5 parts of trans-2-decenal, 0.05-1 part of ethyl decanoate and 0.1-1 part of the *Lucuma nervosa* aroma enhancer;

the *Lucuma nervosa* essence further comprises at least one selected from the group consisting of butyraldehyde, trans-2-pentenal, benzaldehyde and limonene; an amount of the butyraldehyde is 0.01-0.5 parts by weight; an amount of the trans-2-pentenal is 0.05-0.5 parts by weight; an amount of the benzaldehyde is 0.1-1 part by weight; an amount of the limonene is 0.05-0.5 parts by weight;

when the *Lucuma nervosa* essence comprises the solvent, and the solvent comprises at least one selected from the group consisting of an alcohol solvent, an ester solvent and edible oil; the alcohol solvent is at least one selected from the group consisting of ethanol, propylene glycol and glycerol; the ester solvent is glyceryl triacetate; the edible oil is salad oil; and an amount of the solvent is 80-93 parts by weight.

9. A method for preparing a *Lucuma nervosa* essence, comprising a step of:

combining a substrate, wherein the substrate comprises at least one selected from the group consisting of a *Lucuma nervosa* extract and a *Lucuma nervosa* aroma composition, wherein when the substrate comprises the *Lucuma nervosa* extract, the extract is obtained from a *Lucuma nervosa* fruit, and wherein when the substrate comprises the *Lucuma nervosa* aroma composition, the *Lucuma nervosa* composition comprises a solvent, and the solvent comprises at least one selected from the group consisting of an alcohol solvent, an ester solvent and edible oil, and a *Lucuma nervosa* aroma enhancer, wherein the aroma enhancer comprises at least one selected from a group of methyl 3,7-dimethyl-6-octenoate and 3-(methylthio) propyl butyrate, and a mass percentage of the *Lucuma nervosa* aroma enhancer in the *Lucuma nervosa* essence is 0.08%-1.1%.

10. The method according to claim 9, wherein when the substrate is the *Lucuma nervosa* aroma composition, and the *Lucuma nervosa* aroma enhancer is the methyl 3,7-dimethyl-6-octenoate, the mass percentage of the *Lucuma nervosa* aroma enhancer in the *Lucuma nervosa* essence is 0.1%-1%;

when the substrate is the *Lucuma nervosa* aroma composition, and the *Lucuma nervosa* aroma enhancer is the 3-(methylthio)propyl butyrate, the mass percentage of the *Lucuma nervosa* aroma enhancer in the *Lucuma nervosa* essence is 0.1%-1%;

when the substrate is the *Lucuma nervosa* aroma composition, and the *Lucuma nervosa* aroma enhancer is the methyl 3,7-dimethyl-6-octenoate and the 3-(methylthio)propyl butyrate, the mass percentage of the *Lucuma nervosa* aroma enhancer in the *Lucuma nervosa* essence is 0.1%-1%; a mass ratio of the methyl 3,7-dimethyl-6-octenoate to the 3-(methylthio)propyl butyrate is 1:(5-0.2);

when the substrate is the *Lucuma nervosa* aroma composition, and the *Lucuma nervosa* aroma enhancer is the methyl 3,7-dimethyl-6-octenoate and the 3-(methylthio)propyl butyrate, an amount of the *Lucuma nervosa* aroma enhancer and the mass ratio of the methyl 3,7-dimethyl-6-octenoate to the 3-(methylthio)propyl butyrate are shown as the following numbers 1-10:

| Number | Mass ratio of the methyl 3,7-dimethyl-6-octenoate to the 3-(methylthio)propyl butyrate | Mass percentage of the *Lucuma nervosa* aroma enhancer in the *Lucuma nervosa* essence |
|---|---|---|
| 1 | 1:4 | 0.5% |
| 2 | 1:1.5 | 0.5% |
| 3 | 1:1.5 | 0.1% |
| 4 | 1:1.5 | 0.25% |
| 5 | 1:1.5 | 0.6% |
| 6 | 1:1.5 | 0.75% |
| 7 | 1:1.5 | 1% |
| 8 | 1:1 | 0.5% |
| 9 | 1.5:1 | 0.5% |
| 10 | 1:0.25 | 0.5% | when the substrate is the *Lucuma nervosa* aroma composition, and a ratio of parts by weight of the methyl 3,7-dimethyl-6-octenoate to the 3-(methylthio)propyl butyrate is 1:1.5, the mass percentage of the *Lucuma nervosa* aroma enhancer in the *Lucuma nervosa* essence is 0.1%-1%.

11. The method according to claim 9, wherein when the substrate is the *Lucuma nervosa* extract, and the *Lucuma nervosa* aroma enhancer is the methyl 3,7-dimethyl-6-octenoate, the mass percentage of the *Lucuma nervosa* aroma enhancer in the *Lucuma nervosa* essence is 0.1%-1%;

when the substrate is the *Lucuma nervosa* extract, and the *Lucuma nervosa* aroma enhancer is the 3-(methylthio) propyl butyrate, the mass percentage of the *Lucuma nervosa* aroma enhancer in the *Lucuma nervosa* essence is 0.1%-1%;

when the substrate is the *Lucuma nervosa* extract, and the *Lucuma nervosa* aroma enhancer is the methyl 3,7-dimethyl-6-octenoate and the 3-(methylthio)propyl butyrate, the mass percentage of the *Lucuma nervosa* aroma enhancer in the *Lucuma nervosa* essence is 0.1%-1%; the mass ratio of the methyl 3,7-dimethyl-6-octenoate to the 3-(methylthio)propyl butyrate is 1:(5.5-0.15);

when the substrate is the *Lucuma nervosa* extract, and the mass ratio of the methyl 3,7-dimethyl-6-octenoate to the 3-(methylthio)propyl butyrate is 1:5, the mass percentage of the *Lucuma nervosa* aroma enhancer in the *Lucuma nervosa* essence is 0.6%;

when the substrate is the *Lucuma nervosa* extract, and a ratio of parts by weight of the methyl 3,7-dimethyl-6-octenoate to the 3-(methylthio)propyl butyrate is 1:1.25, the mass percentage of the *Lucuma nervosa* aroma enhancer in the *Lucuma nervosa* essence is 0.9%;

when the substrate is the *Lucuma nervosa* extract, and the ratio of parts by weight of the methyl 3,7-dimethyl-6-octenoate to the 3-(methylthio)propyl butyrate is 1:0.2, the mass percentage of the *Lucuma nervosa* aroma enhancer in the *Lucuma nervosa* essence is 0.6%.

12. A method of using the *Lucuma nervosa* essence according to claim 1, comprising using the *Lucuma nervosa* essence in preparing a food, wherein the food has a *Lucuma nervosa* flavor, and the food is a biscuit, a beverage or a bread.

13. The method according to claim 12, wherein when the substrate is the *Lucuma nervosa* extract, the *Lucuma nervosa* essence comprises the following components in parts by weight: 99-99.9 parts of the *Lucuma nervosa* extract and 0.1-1 part of the *Lucuma nervosa* aroma enhancer, a total amount of the *Lucuma nervosa* extract and the *Lucuma nervosa* aroma enhancer is 100 parts by weight;

the *Lucuma nervosa* extract is obtained by one method selected from the group consisting of a supercritical carbon dioxide ($CO_2$) extraction method, a steam distillation method and a solvent extraction method.

14. The method according to claim 12, wherein when the substrate is the *Lucuma nervosa* aroma composition, the *Lucuma nervosa* essence comprises the following components in parts by weight: 1-10 parts of 2-methylpropanol, 0.1-1 part of 3-methylbutyraldehyde, 0.1-1 part of valeraldehyde, 1-6 parts of 2-methyl-1-butanol, 0.1-2 parts of hexaldehyde, 0.2-1 part of 3-mercapto-3-methyl-1-butanol, 0.02-0.5 parts of 2-methylthio ethanol, 0.05-1 part of hexanol, 0.05-1 part of trans-2-octenal, 0.05-1 part of dimethyl trisulfide, 0.1-2 parts of octylaldehyde, 0.05-1 part of 2-ethylhexanol, 0.05-1 part of cis-4-decenal, 0.05-1 part of nonanal, 0.02-1 part of (E,Z)-2,6-nonadienal, 0.01-0.3 parts of (Z,Z)-3,6-nonadienol, 0.01-1 part of decanal, 0.01-0.5 parts of trans-2-decenal, 0.05-1 part of ethyl decanoate and 0.1-1 part of the *Lucuma nervosa* aroma enhancer;

the *Lucuma nervosa* essence further comprises at least one selected from the group consisting of butyraldehyde, trans-2-pentenal, benzaldehyde and limonene; an amount of the butyraldehyde is 0.01-0.5 parts by weight; an amount of the trans-2-pentenal is 0.05-0.5 parts by weight; an amount of the benzaldehyde is 0.1-1 part by weight; an amount of the limonene is 0.05-0.5 parts by weight;

the *Lucuma nervosa* essence further comprises a solvent, and the solvent comprises at least one selected from the group consisting of water, an alcohol solvent, an ester solvent and edible oil; the alcohol solvent is at least one selected from the group consisting of ethanol, propylene glycol and glycerol; the ester solvent is glyceryl triacetate; the edible oil is salad oil; an amount of the solvent is 80-93 parts by weight.

15. The *Lucuma nervosa* essence according to claim 1, wherein the *Lucuma nervosa* aroma enhancer comprises both methyl 3,7-dimethyl-6-octenoate and 3-(methylthio)propyl butyrate.

16. The *Lucuma nervosa* essence according to claim 15, wherein when the substrate is the *Lucuma nervosa* aroma composition, an amount of the *Lucuma nervosa* aroma enhancer and the mass ratio of the methyl 3,7-dimethyl-6-octenoate to the 3-(methylthio)propyl butyrate are shown as the following numbers 1-10:

| Number | Mass ratio of the methyl 3,7-dimethyl-6-octenoate to the 3-(methylthio)propyl butyrate | Mass percentage of the *Lucuma nervosa* aroma enhancer in the *Lucuma nervosa* essence |
| --- | --- | --- |
| 1 | 1:4 | 0.5% |
| 2 | 1:1.5 | 0.5% |
| 3 | 1:1.5 | 0.1% |
| 4 | 1:1.5 | 0.25% |
| 5 | 1:1.5 | 0.6% |
| 6 | 1:1.5 | 0.75% |
| 7 | 1:1.5 | 1% |
| 8 | 1:1 | 0.5% |
| 9 | 1.5:1 | 0.5% |
| 10 | 1:0.25 | 0.5% |

\* \* \* \* \*